US010432029B2

(12) United States Patent
Ikefuji

(10) Patent No.: US 10,432,029 B2
(45) Date of Patent: Oct. 1, 2019

(54) POWER TRANSMISSION DEVICE AND NON-CONTACT POWER FEEDING SYSTEM

(71) Applicant: ROHM CO., LTD., Kyoto-Shi, Kyoto (JP)

(72) Inventor: Yoshihiro Ikefuji, Kyoto (JP)

(73) Assignee: ROHM CO., LTD., Ukyo-Ku, Kyoto-Shi, Kyoto (JP)

( * ) Notice: Subject to any disclaimer, the term of this patent is extended or adjusted under 35 U.S.C. 154(b) by 0 days.

(21) Appl. No.: 15/768,327

(22) PCT Filed: Sep. 9, 2016

(86) PCT No.: PCT/JP2016/076547
§ 371 (c)(1),
(2) Date: Apr. 13, 2018

(87) PCT Pub. No.: WO2017/064955
PCT Pub. Date: Apr. 20, 2017

(65) Prior Publication Data
US 2018/0342898 A1   Nov. 29, 2018

(30) Foreign Application Priority Data
Oct. 15, 2015   (JP) ................ 2015-203398

(51) Int. Cl.
*H02J 50/12* (2016.01)
*H02J 50/80* (2016.01)
(Continued)

(52) U.S. Cl.
CPC .............. *H02J 50/12* (2016.02); *H02J 7/025* (2013.01); *H02J 50/60* (2016.02); *H02J 50/80* (2016.02); *H04B 5/0037* (2013.01); *H04W 4/80* (2018.02)

(58) Field of Classification Search
CPC ............. H02J 50/10; H02J 50/12; H02J 50/60
See application file for complete search history.

(56) References Cited

U.S. PATENT DOCUMENTS

| | | | |
|---|---|---|---|
| 2010/0244577 A1* | 9/2010 | Shimokawa | .......... B60L 53/305 307/104 |
| 2014/0028109 A1* | 1/2014 | Simon | ..................... H01F 38/14 307/104 |

(Continued)

FOREIGN PATENT DOCUMENTS

| | | | |
|---|---|---|---|
| JP | 2012075200 A | 4/2012 | |
| JP | 2014033504 A | 2/2014 | |

(Continued)

OTHER PUBLICATIONS

International Search Report corresponding to Application No. PCT/JP2016/076547; dated Nov. 8, 2016.

*Primary Examiner* — Daniel J Cavallari
(74) *Attorney, Agent, or Firm* — Cantor Colburn LLP

(57) ABSTRACT

In a non-contact power feeding system which is formed with a power transmission device that includes a power transmission-side resonant circuit including a power transmission-side coil and a power reception device that includes a power reception-side resonant circuit including a power reception-side coil and which can transmit and receive power by a magnetic field resonance method, the control circuit of the power transmission device supplies, before the power transmission, a predetermined determination alternating current voltage to the power transmission-side resonant circuit so as to detect the amplitude of a current flowing through the power transmission-side coil at that time. The control circuit controls the performance of the power transmission based on the current amplitude detection value.

10 Claims, 13 Drawing Sheets

(51) Int. Cl.
    *H02J 50/60*     (2016.01)
    *H04B 5/00*     (2006.01)
    *H02J 7/02*     (2016.01)
    *H04W 4/80*     (2018.01)

(56) References Cited

U.S. PATENT DOCUMENTS

| | | |
|---|---|---|
| 2014/0035521 A1 | 2/2014 | Endo |
| 2014/0222236 A1 | 8/2014 | Yamasaki |
| 2014/0266036 A1 | 9/2014 | Jung et al. |
| 2014/0361736 A1 | 12/2014 | Kwon et al. |
| 2016/0013683 A1 | 1/2016 | Endo |
| 2017/0237279 A1 | 8/2017 | Kwon et al. |

FOREIGN PATENT DOCUMENTS

| | | |
|---|---|---|
| JP | 2014155304 A | 8/2014 |
| JP | 2014183731 A | 9/2014 |
| JP | 2014239638 A | 12/2014 |

\* cited by examiner

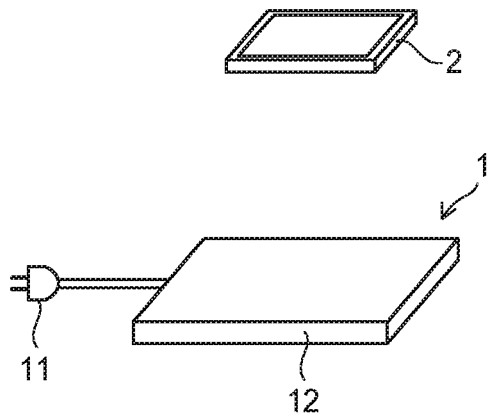
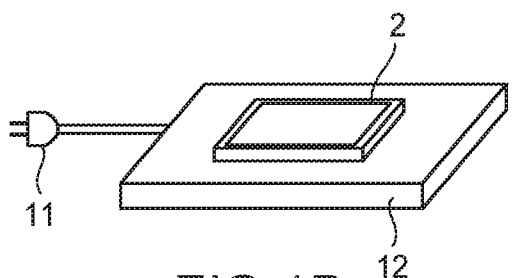
FIG.1A  FIG.1B
FIG.2
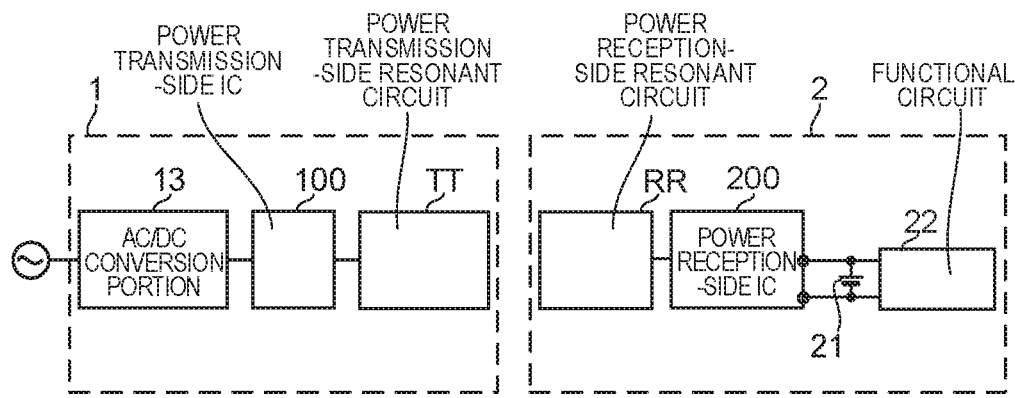
FIG.3
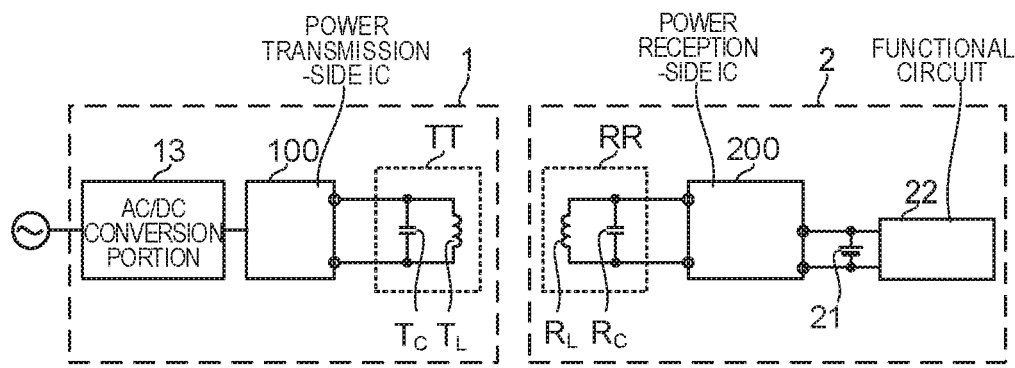

FIG.9
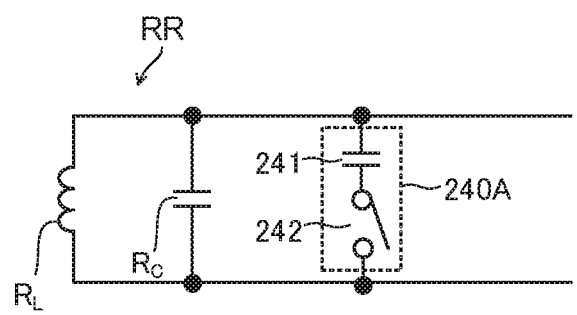
FIG.10
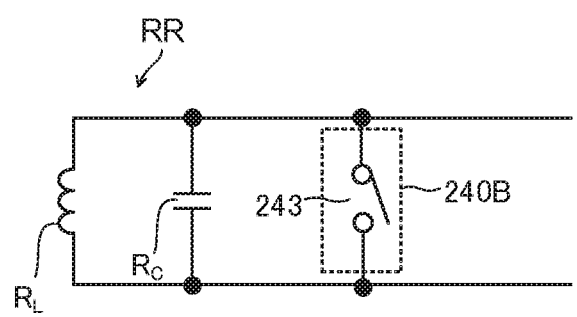
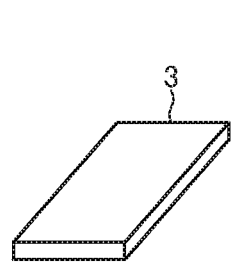
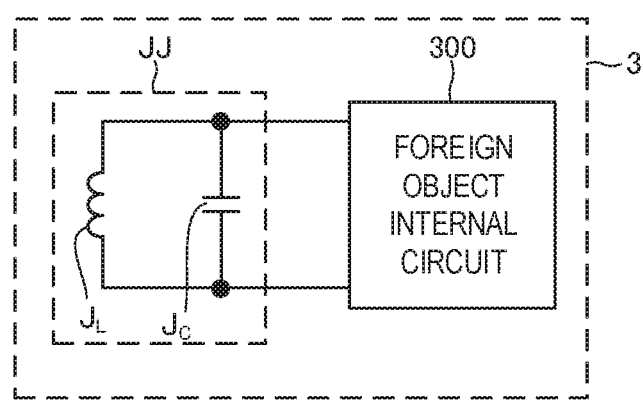
FIG.11A          FIG.11B FIG.12
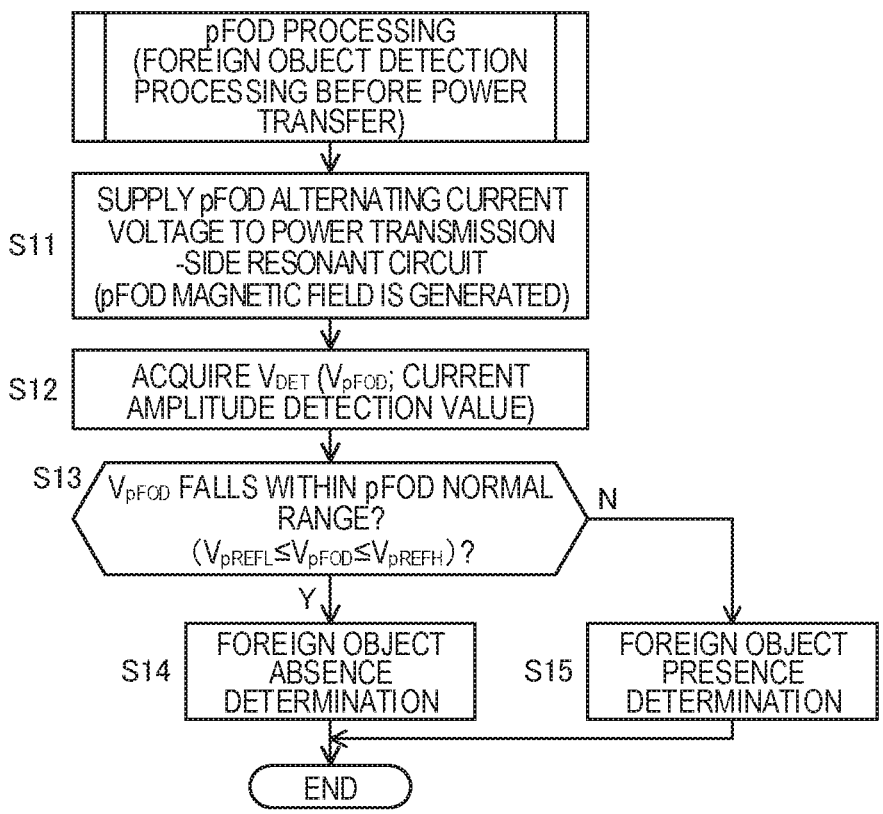
FIRST CASE   SECOND CASE   THIRD CASE   FOURTH CASE
 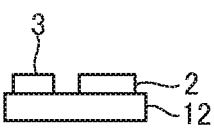  
FIG.13A     FIG.13B       FIG.13C      FIG.13D
FIG.14
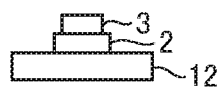
FIG.15
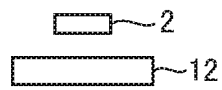

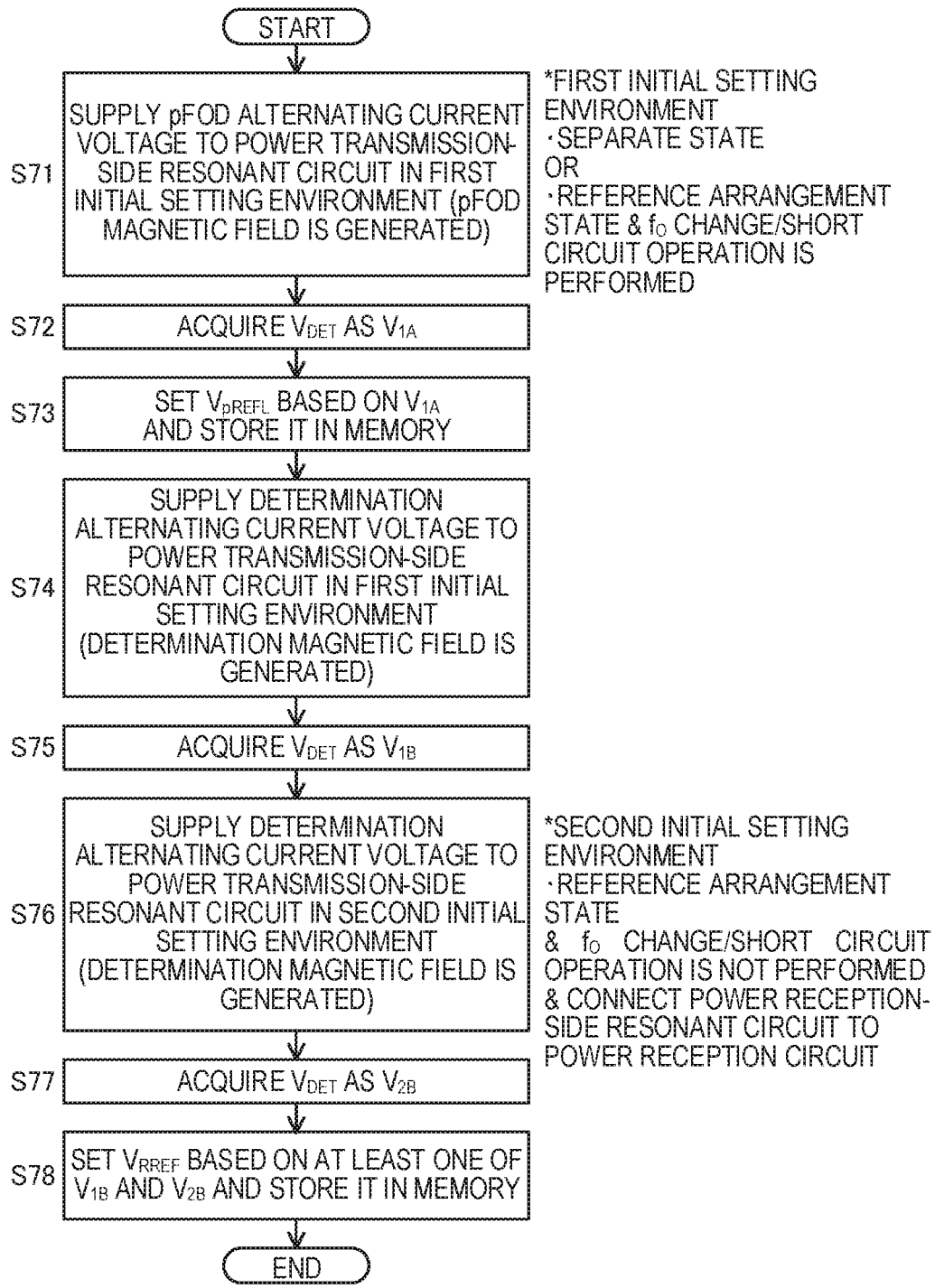

*ASSUME "(pFOD ALTERNATING CURRENT VOLTAGE)
< (DETERMINATION ALTERNATING CURRENT VOLTAGE)"

POWER TRANSMISSION DEVICE AND NON-CONTACT POWER FEEDING SYSTEM

CROSS REFERENCE TO RELATED APPLICATIONS

This is the U.S. national stage of application No. PCT/JP2016/076547, filed on Sep. 9, 2016. Priority under 35 U.S.C. § 119(a) and 35 U.S.C. § 365(b) is claimed from Japanese Application No. 2015-203398, filed on Oct. 15, 2015, the disclosure of which is also incorporated herein by reference.

TECHNICAL FIELD

The present invention relates to a power transmission device and a non-contact power feeding system.

BACKGROUND ART

As one type of proximity wireless communication, there is wireless communication which is performed by NFC (Near field communication) that uses 13.56 MHz as a carrier frequency. On the other hand, a technology is also proposed which utilizes a coil used for NFC communication so as to perform non-contact power feeding by a magnetic field resonance method.

In the non-contact power feeding utilizing magnetic field resonance, a power transmission-side resonant circuit including a power transmission-side coil is arranged in a power feeding device, a power reception-side resonant circuit including a power reception-side coil is arranged in an electronic device serving as a power reception device and the resonant frequencies of the resonant circuits are set to a common reference frequency. An alternating current is then passed through the power transmission-side coil, and thus an alternating magnetic field at the reference frequency is generated in the power transmission-side coil. Then, the alternating magnetic field is transmitted to the power reception-side resonant circuit which resonates at the reference frequency, and thus an alternating current flows through the power reception-side coil. In other words, power is transmitted from the power transmission-side resonant circuit including the power transmission-side coil to the power reception-side resonant circuit including the power reception-side coil.

RELATED ART DOCUMENT

Patent Document

Patent document 1: Japanese Unexamined Patent Application Publication No. 2014-33504

DISCLOSURE OF THE INVENTION

Problems to be Solved by the Invention

When power transfer is performed, an electronic device is normally arranged in a given predetermined region (for example, on a predetermined power feeding stage in a power feeding device). However, depending on conditions, it is likely that the electronic device is not arranged in the predetermined region though a distance from the power feeding device is somewhat short. When in such a case, a power transmission operation is performed, it is likely that power transfer is performed in a state where a power transfer efficiency is excessively low (that is, in an undesirable state), and it is also likely that excessive unnecessary radiation is generated. The optimization of power transmission control with consideration given to such conditions is desired.

Hence, an object of the present invention is to provide a power transmission device and a non-contact power feeding system which contribute to the optimization of power transmission control.

Means for Solving the Problem

A power transmission device according to the present invention which can transmit power to a power reception device by a magnetic field resonance method, includes: a power transmission-side resonant circuit which includes a power transmission-side coil for performing the power transmission; a power transmission circuit which can supply an alternating current voltage to the power transmission-side resonant circuit; a detection circuit which detects the amplitude of a current flowing through the power transmission-side coil; and a control circuit which performs power transmission control on the power by controlling a state of the supply of the alternating current voltage to the power transmission-side resonant circuit, where before the power transmission, the control circuit acquires, as a determination amplitude detection value, a detection value by the detection circuit when a predetermined determination alternating current voltage is supplied to the power transmission-side resonant circuit, and controls, based on the determination amplitude detection value, the performance of the power transmission through a determination as to whether or not the power reception device can perform proper power reception.

Specifically, for example, preferably, in the power transmission device described above, when the determination amplitude detection value is equal to or less than a predetermined reference value, the control circuit determines that the power reception device can perform the proper power reception so as to allow the performance of the power transmission whereas when the determination amplitude detection value is not equal to or less than the predetermined reference value, the control circuit restricts the performance of the power transmission.

Specifically, for example, preferably, in the power transmission device described above, after the control circuit receives, from the power reception device, a response signal for a predetermined signal transmitted wirelessly from the power transmission device, the control circuit performs processing including the acquisition of the determination amplitude detection value.

A non-contact power feeding system according to the present invention includes: a power transmission device that includes a power transmission-side resonant circuit including a power transmission-side coil for transmitting power; and a power reception device that includes a power reception-side resonant circuit including a power reception-side coil for receiving the power and can transmit and receive the power by a magnetic field resonance method, where the power transmission device includes: a power transmission circuit which can supply an alternating current voltage to the power transmission-side resonant circuit; a detection circuit which detects an amplitude of a current flowing through the power transmission-side coil; and a control circuit which performs power transmission control on the power by controlling a state of the supply of the alternating current voltage to the power transmission-side resonant circuit, and before the power transmission, the control circuit acquires, as a determination amplitude detection value, a detection value by the detection circuit when a predetermined determination alternating current voltage is supplied to the power transmission-side resonant circuit, and controls, based on the determination amplitude detection value, performance of the power transmission through a determination as to whether or not the power reception device can perform proper power reception.

Specifically, for example, preferably, in the non-contact power feeding system described above, when the determination amplitude detection value is equal to or less than a predetermined reference value, the control circuit determines that the power reception device can perform the proper power reception so as to allow the performance of the power transmission whereas when the determination amplitude detection value is not equal to or less than the predetermined reference value, the control circuit restricts the performance of the power transmission.

Specifically, for example, preferably, in the non-contact power feeding system described above, after the control circuit receives, from the power reception device, a response signal for a predetermined signal transmitted wirelessly from the power transmission device, the control circuit performs processing including the acquisition of the determination amplitude detection value.

For example, preferably, in the non-contact power feeding system described above, the power reception device includes a change/short circuit which can change a resonant frequency of the power reception-side resonant circuit from a reference frequency that is a resonant frequency at a time of the power reception or can short-circuit the power reception-side coil, before the power transmission, the control circuit can perform: first processing for determining whether or not a foreign object is present that differs from the power reception device and that can generate a current based on a magnetic field generated in the power transmission-side coil; and second processing for determining whether or not the power reception device can perform the proper power reception, in the first processing, in a state where the power reception device changes the resonant frequency of the power reception-side resonant circuit or short-circuits the power reception-side coil according to a signal by communication from the power transmission device, a predetermined foreign object determination alternating current voltage is supplied to the power transmission-side resonant circuit, a detection value by the detection circuit at that time is acquired as a foreign object detection amplitude detection value and whether or not the foreign object is present is determined based on the foreign object detection amplitude detection value and when it is determined that the foreign object is present, the performance of the power transmission is restricted.

Here, for example, preferably, in the non-contact power feeding system described above, when the control circuit determines that the foreign object is not present and determines that the power reception device can perform the proper power reception, the control circuit allows the performance of the power transmission.

Here, for example, preferably, in the non-contact power feeding system described above, the control circuit determines, in the first processing, whether or not the foreign object detection amplitude detection value falls outside a predetermined range so as to determine whether or not the foreign object is present.

For example, preferably, in the non-contact power feeding system described above, when the determination amplitude detection value is acquired, the changing or the short-circuiting by the change/short circuit is not performed.

Advantages of the Invention

According to the present invention, it is possible to provide a power transmission device and a non-contact power feeding system which contribute to the optimization of power transmission control.

BRIEF DESCRIPTION OF DRAWINGS

FIG. 1A and FIG. 1B are schematic external views of a power feeding device and an electronic device according to an embodiment of the present invention;

FIG. 2 is a schematic internal configuration diagram of the power feeding device and the electronic device according to the embodiment of the present invention;

FIG. 3 is a schematic internal configuration diagram of the power feeding device and the electronic device according to the embodiment of the present invention;

FIG. 9 is a circuit diagram showing an example of a resonant state change circuit in the embodiment of the present invention;

FIG. 10 is a circuit diagram showing another example of the resonant state change circuit in the embodiment of the present invention;

FIG. 11A and FIG. 11B are respectively a schematic outline view and a schematic internal configuration diagram of a foreign object in the embodiment of the present invention;

FIG. 12 is an operational flowchart of pFOD processing which is performed in the power feeding device;

FIG. 13A to FIG. 13D are diagrams illustrating arrangement relationships between a power feeding stage, the electronic device and the foreign object;

FIG. 14 is a diagram showing an arrangement relationship between the power feeding stage, the electronic device and the foreign object;

FIG. 15 is a diagram showing an example of an arrangement relationship between the power feeding stage and the electronic device;

FIG. 23 is an operational flowchart of initial setting processing performed in the power feeding device.

DESCRIPTION OF EMBODIMENTS

Figure 4:
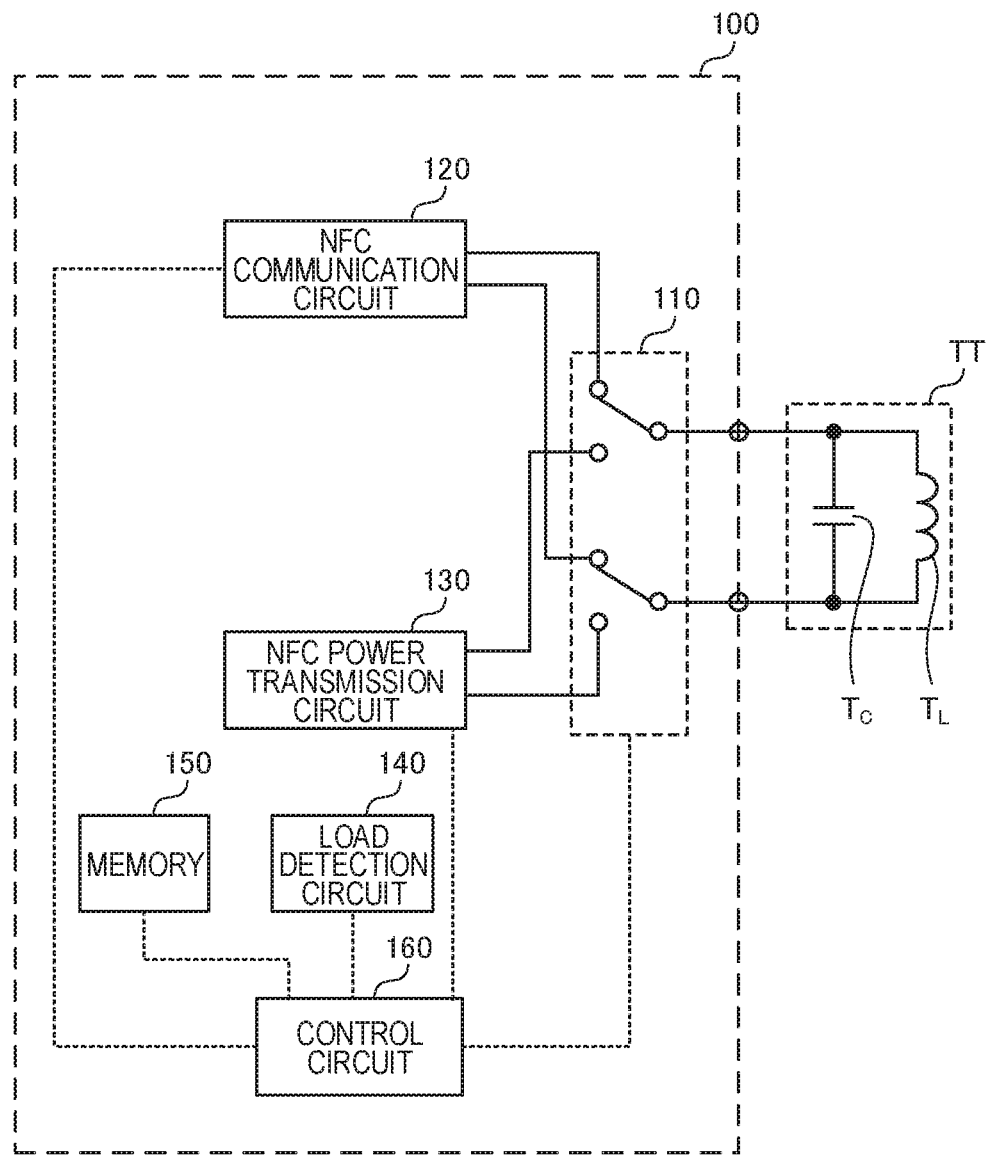
FIG. 4 is a partial configuration diagram of the power feeding device including an internal block diagram of an IC within the power feeding device in the embodiment of the present invention.

An example of the embodiment of the present invention will be specifically described below with reference to drawings. In the drawings referenced, the same portions are identified with the same symbols, and the repeated description of the same portions will be omitted in principle. In the present specification, for simplification of description, signs or symbols which refer to information, signals, physical amounts, state amounts, members and the like are provided, and thus the names of the information, the signals, the physical amounts, the state amounts, the members and the like corresponding to the signs or symbols may be omitted or described in short. In an arbitrary flowchart which will be described later, a plurality of types of processing in an arbitrary plurality of steps can be arbitrarily changed in the order in which they are performed or can be performed at the same time unless otherwise a contradiction arises in the details of the processing.

FIG. 1A and FIG. 1B are schematic external views of a power feeding device 1 and an electronic device 2 according to the embodiment of the present invention. Specifically, FIG. 1A is an external view of the power feeding device 1 and the electronic device 2 when they are in a separate state, and FIG. 1B is an external view of the power feeding device 1 and the electronic device 2 when they are in a reference arrangement state. The significance of the separate state and the reference arrangement state will be described in detail later. The power feeding device 1 and the electronic device 2 form a non-contact power feeding system. The power feeding device 1 includes a power supply plug 11 which receives commercial alternating current power and a power feeding stage 12 which is formed of a resin material.

FIG. 2 shows a schematic internal configuration diagram of the power feeding device 1 and the electronic device 2. The power feeding device 1 includes: an AC/DC conversion portion 13 which generates a direct current voltage having a predetermined voltage value from a commercial alternating current voltage input through the power supply plug 11 and which outputs the direct current voltage; a power transmission-side IC 100 (hereinafter also referred to as an IC 100) which is an integrated circuit that is driven by use of the output voltage of the AC/DC conversion portion 13; and a power transmission-side resonant circuit TT (hereinafter also referred to as a resonant circuit TT) which is connected to the IC 100. The AC/DC conversion portion 13, the power transmission-side IC 100 and the resonant circuit TT can be arranged within the power feeding stage 12. A circuit other than IC 100 which is driven by use of the output voltage of the AC/DC conversion portion 13 can be provided in the power feeding device 1.

The electronic device 2 includes: a power reception-side IC 200 (hereinafter also referred to as an IC 200) which is an integrated circuit; a power reception-side resonant circuit RR (hereinafter also referred to as a resonant circuit RR) which is connected to the IC 200; a battery 21 which is a secondary battery; and a functional circuit 22 which is driven based on the output voltage of the battery 21. The IC 200 can supply charging power to the battery 21 though the details thereof will be described later. The IC 200 may be driven by the output voltage of the battery 21 or may be driven based on a voltage from a voltage source other than the battery 21. A direct current voltage which is obtained by rectifying a signal for NFC communication (which will be described in detail later) received from the power feeding device 1 may serve as a drive voltage for the IC 200. In this case, even when the battery 21 does not have the remaining capacity, the IC 200 can be driven.

The electronic device 2 may be an arbitrary electronic device, and is, for example, a mobile phone (including a mobile phone classified as a smart phone), a portable information terminal, a tablet-type personal computer, a digital camera, an MP3 player, a pedometer or a Bluetooth (registered trademark) headset. The functional circuit 22 realizes an arbitrary function which needs to be realized by the electronic device 2. Hence, for example, when the electronic device 2 is a smart phone, the functional circuit 22 includes a call processing portion for realizing a call with the device of a party on the other end, a communication processing portion for transmitting and receiving information to and from other devices through a network and the like. For example, when the electronic device 2 is a digital camera, the functional circuit 22 includes a drive circuit which drives an image sensing element, an image processing circuit which generates image data from the output signal of the image sensing element and the like. It may be considered that the functional circuit 22 is a circuit which is provided in a device outside the electronic device 2.

As shown in FIG. 3, the resonant circuit TT includes a coil $T_L$ which is a power transmission-side coil and a capacitor $T_C$ which is a power transmission-side capacitor, and the resonant circuit RR includes a coil $R_L$ which is a power reception-side coil and a capacitor $R_C$ which is a power reception-side capacitor. In the following description, it is assumed that in order to give a concrete form to the description, unless otherwise described, the power transmission-side coil $T_L$ and the power transmission-side capacitor $T_C$ are connected in parallel to each other so as to form the resonant circuit TT as a parallel resonant circuit, and that the power reception-side coil $R_L$ and the power reception-side capacitor $R_C$ are connected in parallel to each other so as to form the resonant circuit RR as a parallel resonant circuit. However, the power transmission-side coil $T_L$ and the power transmission-side capacitor $T_C$ may be connected in series with each other so as to form the resonant circuit TT as a series resonant circuit, and the power reception-side coil $R_L$ and the power reception-side capacitor $R_C$ may be connected in series with each other so as to form the resonant circuit RR as a series resonant circuit.

As shown in FIG. 1B, when the electronic device 2 is placed within a predetermined range on the power feeding stage 12, by a magnetic field resonance method (that is, by the utilization of magnetic field resonance), it is possible to perform communication, power transmission and power reception between the devices 1 and 2. The magnetic field resonance is also referred to as magnetic field sympathetic oscillation or the like.

The communication between the devices 1 and 2 is wireless communication (hereinafter referred to as NFC communication) performed by NFC (Near field communication), and the frequency of a carrier for the communication is 13.56 MHz (megahertz). In the following description, 13.56 MHz is referred to as a reference frequency. Since the NFC communication between the devices 1 and 2 is performed by the magnetic field resonance method utilizing the resonant circuits TT and RR, the resonant frequencies of the resonant circuits TT and RR each are set to the reference frequency. However, the resonant frequency of the resonant circuit RR can be temporarily changed from the reference frequency as will be described later.

The power transmission and the power reception between the devices 1 and 2 are the power transmission performed by the NFC from the power feeding device 1 to the electronic device 2 and the power reception performed by the NFC in the electronic device 2. The power transmission and the power reception are collectively referred to as NFC power transfer or simply referred to as power transfer. Power is transmitted by the magnetic field resonance method from the coil $T_L$ to the coil $R_L$, and thus the power transfer is realized in a non-contact manner.

In the power transfer utilizing the magnetic field resonance, an alternating current is passed through the power transmission-side coil $T_L$, and thus an alternating magnetic field at the reference frequency is generated in the power transmission-side coil $T_L$. Then, the alternating magnetic field is transmitted to the resonant circuit RR which resonates at the reference frequency (that is, which performs sympathetic oscillation) such that an alternating current flows through the power reception-side coil $R_L$. In other words, power is transmitted from the resonant circuit TT including the power transmission-side coil $T_L$ to the resonant circuit RR including the power reception-side coil $R_L$. In the following description, the magnetic field which is generated by the coil $T_L$ or the coil $R_L$ in the NFC communication or the power transfer is the alternating magnetic field which oscillates at the reference frequency unless otherwise described though the description thereof may be omitted.

A state where the electronic device 2 is placed within the predetermined range on the power feeding stage 12 such that it is possible to realize the NFC communication and the power transfer described above is referred to as the reference arrangement state (see FIG. 1B). When the magnetic field resonance is utilized, even if the distance to the device on the other side is relatively long, it is possible to perform the communication and the power transfer whereas if the electronic device 2 is located a considerable distance away from the power feeding stage 12, it is impossible to realize the NFC communication and the power transfer. A state where the electronic device 2 is located sufficiently away from the power feeding stage 12 such that it is impossible to realize the NFC communication and the power transfer described above is referred to as the separate state (see FIG. 1A). Although in the power feeding stage 12 shown in FIG. 1A, the front surface is flat, a recess or the like which corresponds to the shape of the electronic device 2 to be placed thereon may be formed in the power feeding stage 12.

Figure 5:
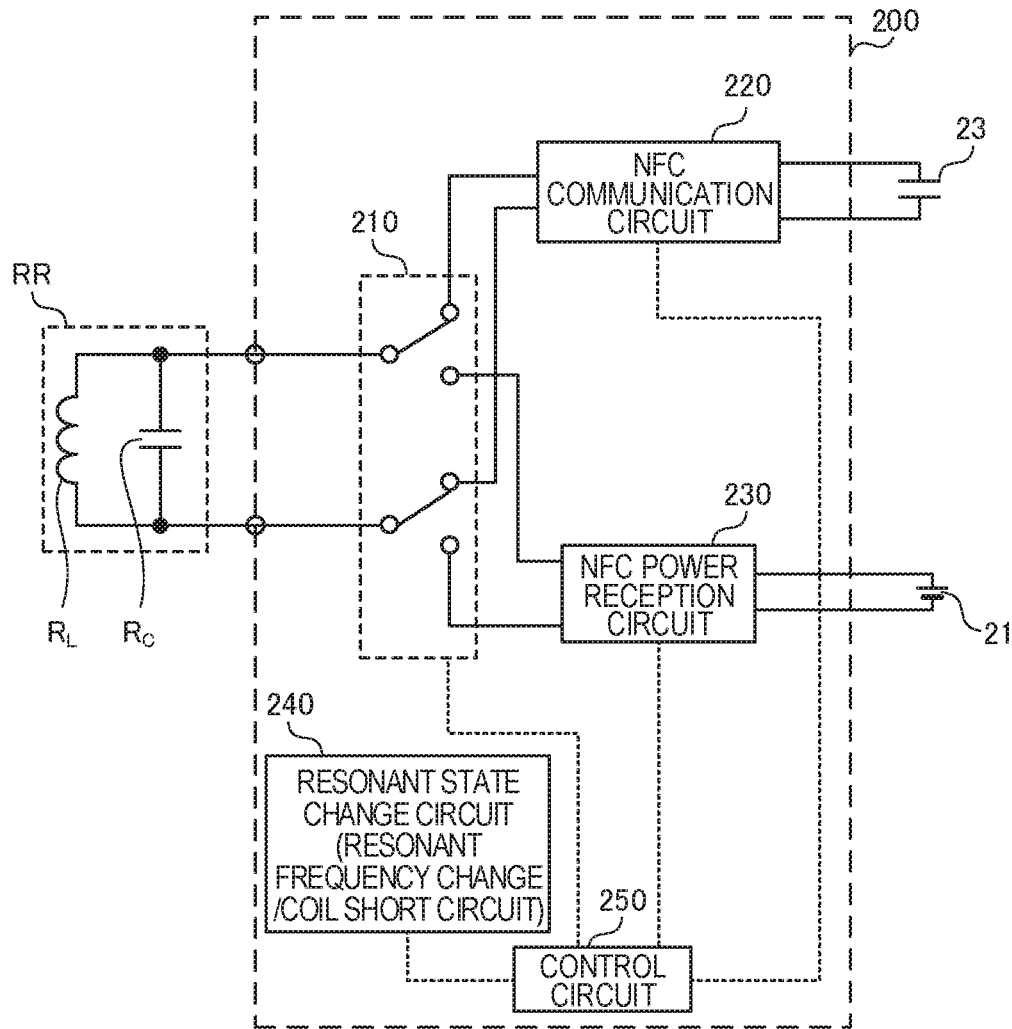
FIG. 5 is a partial configuration diagram of the electronic device including an internal block diagram of an IC within the electronic device in the embodiment of the present invention.

FIG. 4 shows a partial configuration diagram of the power feeding device 1 including an internal block diagram of the IC 100. In the IC 100, individual portions are provided which are represented by symbols 110, 120, 130, 140, 150 and 160. FIG. 5 shows a partial configuration diagram of the electronic device 2 including an internal block diagram of the IC 200. In the IC 200, individual portions are provided which are represented by symbols 210, 220, 230, 240 and 250. A capacitor 23 which outputs the drive voltage for the IC 200 may be connected to the IC 200. The capacitor 23 can output the direct current voltage obtained by rectifying the signal for the NFC communication received from the power feeding device 1.

The switching circuit 110 connects, under control of the control circuit 160, either of the NFC communication circuit 120 and the NFC power transmission circuit 130 to the resonant circuit TT. The switching circuit 110 can be formed with a plurality of switches which are interposed between the resonant circuit TT and the circuits 120 and 130. An arbitrary switch which is described in the present specification may be formed with a semiconductor switching element such as a field effect transistor.

The switching circuit 210 connects, under control of the control circuit 250, the resonant circuit RR to either of the NFC communication circuit 220 and the NFC power reception circuit 230. The switching circuit 210 can be formed with a plurality of switches which are interposed between the resonant circuit RR and the circuits 220 and 230.

A state where the resonant circuit TT is connected through the switching circuit 110 to the NFC communication circuit 120 and where the resonant circuit RR is connected through the switching circuit 210 to the NFC communication circuit 220 is referred to as a communication connection state. In the communication connection state, the NFC communication can be performed. In the communication connection state, the NFC communication circuit 120 can supply an alternating current signal (an alternating current voltage) at the reference frequency to the resonant circuit TT. The NFC communication between the devices 1 and 2 is performed by a half-duplex method.

When in the communication connection state, the power feeding device 1 is a transmission side, an arbitrary information signal is superimposed on the alternating current signal supplied by the NFC communication circuit 120 to the resonant circuit TT, and thus the information signal is transmitted from the coil $T_L$ serving as a power feeding device-side antenna coil and is received by the coil $R_L$ serving as an electronic device-side antenna coil. The information signal received in the coil $R_L$ is extracted in the NFC communication circuit 220. When in the communication connection state, the electronic device 2 is the transmission side, the NFC communication circuit 220 can transmit an arbitrary information signal (response signal) from the coil $R_L$ in the resonant circuit RR to the coil $T_L$ in the resonant circuit TT. As is known, this transmission is realized by a load modulation method in which based on an ISO standard (for example, ISO14443 standard), the impedance of the coil $R_L$ (the electronic device-side antenna coil) seen from the coil $T_L$ (the power feeding device-side antenna coil) is changed. The information signal transmitted from the electronic device 2 is extracted in the NFC communication circuit 120.

A state where the resonant circuit TT is connected through the switching circuit 110 to the NFC power transmission circuit 130 and where the resonant circuit RR is connected through the switching circuit 210 to the NFC power reception circuit 230 is referred to as a power feeding connection state.

In the power feeding connection state, the NFC power transmission circuit 130 can perform a power transmission operation, and the NFC power reception circuit 230 can perform a power reception operation. The power transfer is realized by the power transmission operation and the power reception operation. In the power transmission operation, the power transmission circuit 130 supplies, to the resonant circuit TT, a power transmission alternating current signal (power transmission alternating current voltage) at the reference frequency so as to generate a power transmission magnetic field (power transmission alternating magnetic field) at the reference frequency in the power transmission-side coil $T_L$, and thus power is transmitted by the magnetic field resonance method from the resonant circuit TT (the power transmission-side coil $T_L$) to the resonant circuit RR. The power received in the power reception-side coil $R_L$ based on the power transmission operation is fed to the power reception circuit 230, and in the power reception operation, the power reception circuit 230 generates arbitrary direct current power from the received power and outputs it. With the output power of the power reception circuit 230, it is possible to charge the battery 21.

Figure 6:
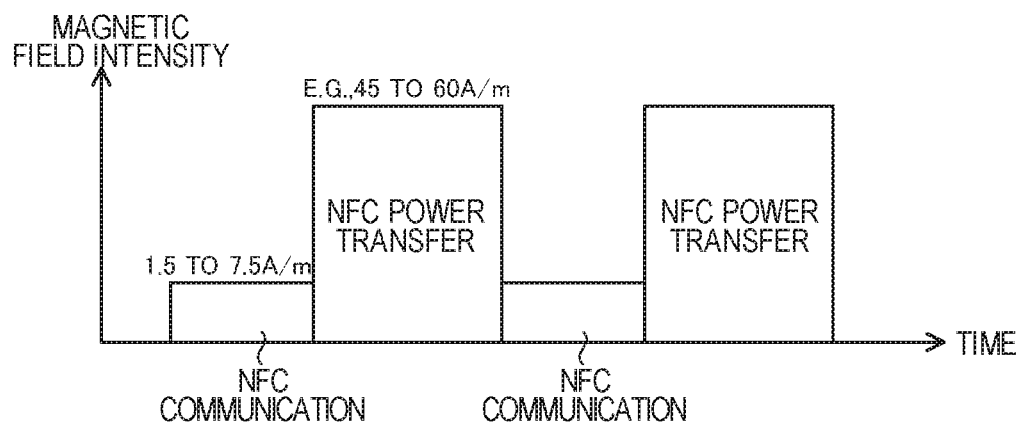
FIG. 6 is a diagram showing a change in a magnetic field intensity when NFC communication and power transfer are alternately performed.

Although a magnetic field is also generated in the coil $T_L$ or the coil $R_L$ when the NFC communication is performed in the communication connection state, a magnetic field intensity in the NFC communication falls within a predetermined range. The lower limit value and the upper limit value in the range are defined in the standard of the NFC so as to be 1.5 A/m and 7.5 A/m, respectively. By contract, in the power transfer (that is, the power transmission operation), the intensity of a magnetic field (the magnetic field intensity of the power transmission magnetic field) generated in the power transmission-side coil $T_L$ is more than the upper limit value described above so as to be, for example, about 45 to 60 A/m. In the non-contact power feeding system including the devices 1 and 2, it is possible to alternately perform the NFC communication and the power transfer (NFC power transfer), and the state of a magnetic field intensity at that time is shown in FIG. 6.

Figure 7:
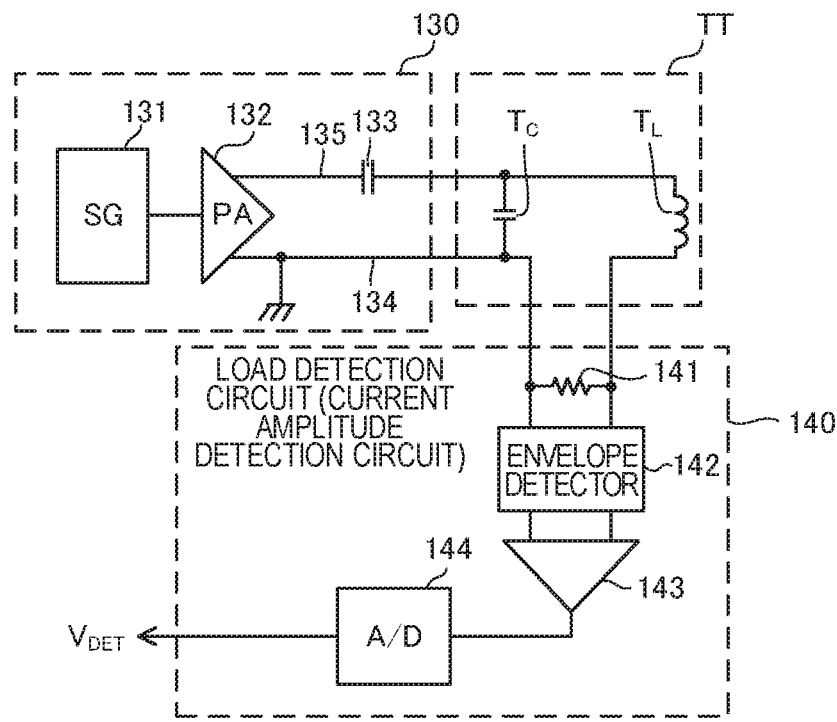
FIG. 7 is a diagram showing a relationship between a power transmission circuit, a load detection circuit and a resonant circuit within the power feeding device.

The load detection circuit 140 detects the magnitude of a load for the power transmission-side coil $T_L$, that is, the magnitude of a load for the power transmission-side coil $T_L$ when the alternating current signal is supplied from the power transmission circuit 130 to the power transmission-side coil $T_L$. FIG. 7 shows a relationship between the power transmission circuit 130, the load detection circuit 140 and the resonant circuit TT in the power feeding connection state. In FIG. 7, the switching circuit 110 is omitted.

The power transmission circuit 130 includes: a signal generator 131 which generates a sinusoidal signal at the reference frequency; an amplifier (power amplifier) 132 which amplifies the sinusoidal signal generated in the signal generator 131 so as to output the amplified sinusoidal signal between lines 134 and 135 with reference to the potential of the line 134; and a capacitor 133. However, it may be considered that the capacitor 133 is inserted between the power transmission circuit 130 and the resonant circuit TT. On the other hand, the load detection circuit 140 includes a sense resistor 141, an envelope detector 142, an amplifier 143 and an A/D converter 144. Although the intensity of the sinusoidal signal generated by the signal generator 131 is fixed to a constant value, the amplification factor of the amplifier 132 is variably set by the control circuit 160.

One end of the capacitor 133 is connected to the line 135. In the power feeding connection state, the other end of the capacitor 133 is connected in common to one ends of the capacitor $T_C$ and the coil $T_L$, and the other end of the coil $T_L$ is connected in common to the line 134 and the other end of the capacitor $T_C$ through the sense resistor 141.

Figure 8:
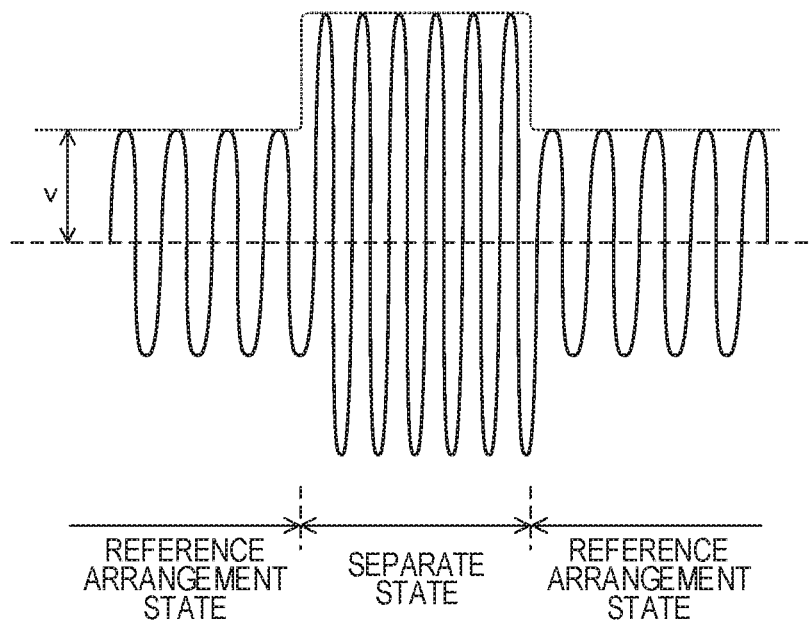
FIG. 8 is a waveform diagram of a voltage drop in a sense resistor of FIG. 7.

The power transmission operation is realized by supplying the alternating current signal (power transmission alternating current voltage) from the amplifier 132 through the capacitor 133 to the resonant circuit TT. In the power feeding connection state, the alternating current signal from the amplifier 132 is supplied to the resonant circuit TT, and thus an alternating current at the reference frequency flows through the power transmission-side coil $T_L$, with the result that an alternating current voltage drop is produced in the sense resistor 141. The solid line waveform of FIG. 8 is a voltage waveform of the voltage drop in the sense resistor 141. When on the resonant circuit TT, under the conditions in which the intensity of the magnetic field generated in the power transmission-side $T_L$ is constant, the electronic device 2 is brought close to the power feeding stage 12, a current based on the magnetic field generated in the power transmission-side coil $T_L$ flows through the power reception-side coil $R_L$ whereas a counter electromotive force based on the current flowing through the power reception-side coil $R_L$ is generated in the power transmission-side coil $T_L$, and the counter electromotive force acts so as to reduce the current flowing through the power transmission-side coil $T_L$. Hence, as shown in FIG. 8, the amplitude of the voltage drop of the sense resistor 141 in the reference arrangement state is smaller than that in the separate state.

The envelope detector 142 detects the envelope of a signal of the voltage drop in the sense resistor 141 so as to output an analogue voltage signal proportional to the voltage v of FIG. 8. The amplifier 143 amplifies the output signal of the envelope detector 142 and outputs it. The A/D converter 144 converts the output voltage signal of the amplifier 143 into a digital signal so as to output a digital voltage value $V_{DET}$. As is understood from the above description, the voltage value $V_{DET}$ has a value proportional to the amplitude of the current flowing through the sense resistor 141 (hence, the amplitude of the current flowing through the power transmission-side coil $T_L$) (as the amplitude is increased, the voltage value $V_{DET}$ is also increased). Hence, the load detection circuit 140 can be said to be a current amplitude detection circuit which detects the amplitude (hereinafter also referred to as a current amplitude) of the current flowing through the power transmission-side coil $T_L$, and the amplitude detection value thereof can be considered to be the voltage value $V_{DET}$. The envelope detector 142 may be provided in a stage subsequent to the amplifier 143. However, as shown in FIG. 7, when the envelope detector 142 is provided in a stage preceding the amplifier 143, it is advantageously possible to adopt, as the amplifier 143, an amplifier whose response performance for high-frequency waves is lower.

For the power transmission-side coil $T_L$ which generates a magnetic field, a coil such as the power reception-side coil $R_L$ which is magnetically coupled to the power transmission-side coil $T_L$ can be considered to be a load, and depending on the magnitude of the load, the voltage value $V_{DET}$ which is the detection value of the load detection circuit 140 is changed. Hence, it can also be considered that the load detection circuit 140 detects the magnitude of the load by the output of the voltage value $V_{DET}$. The magnitude of the load here can be said to be the magnitude of the load for the power transmission-side coil $T_L$ in the power transmission or can be said to be the magnitude of the load of the electronic device 2 in the power transmission which is seen from the power feeding device 1. The sense resistor 141 may be provided within the IC 100 or may be provided outside the IC 100.

The memory 150 (see FIG. 4) is formed with a nonvolatile memory, and stores arbitrary information in a nonvolatile manner. The control circuit 160 comprehensively controls the operations of the individual portions within the IC 100. The control performed by the control circuit 160 includes, for example, control on the switching operation of the switching circuit 110, control on the details of the communication operation and the power transmission operation of the communication circuit 120 and the power transmission circuit 130 and control on whether or not the operations are performed, control on the operation of the load detection circuit 140 and control on the storage of the memory 150 and control on the reading thereof. The control circuit 160 incorporates a timer (unillustrated), and thereby can measure the length of a time between arbitrary timings.

The resonant state change circuit 240 (see FIG. 5) in the electronic device 2 is a resonant frequency change circuit which can change the resonant frequency of the resonant circuit RR from the reference frequency to another predetermined frequency $f_M$ or a coil short circuit which can short-circuit the power reception-side coil $R_L$ in the resonant circuit RR.

A resonant frequency change circuit 240A in FIG. 9 is an example of the resonant frequency change circuit serving as the resonant state change circuit 240. The resonant frequency change circuit 240A is formed with a series circuit of a capacitor 241 and a switch 242, one end of the series circuit is connected in common to one ends of the capacitor $R_C$ and the coil $R_L$ and the other end of the series circuit is connected in common to the other ends of the capacitor $R_C$ and the coil $R_L$. The switch 242 is turned on or off under control of the control circuit 250. When the switch 242 is turned off, the capacitor 241 is separated from the capacitor $R_C$ and the coil $R_L$, and thus when a parasitic inductance and a parasitic capacitance are ignored, the resonant circuit RR is formed with only the coil $R_L$ and the capacitor $R_C$, and the resonant frequency of the resonant circuit RR coincides with the reference frequency. In other words, when the switch 242 is turned off, a power reception-side capacitance for determining the resonant frequency of the resonant circuit RR is the capacitor $R_C$ itself. When the switch 242 is turned on, since the capacitor 241 is connected in parallel to the capacitor $R_C$, the resonant circuit RR is formed with the coil $R_L$ and the combined capacitance of the capacitors $R_C$ and 241, with the result that the resonant frequency of the resonant circuit RR is the frequency $f_M$ which is lower than the reference frequency. In other words, when the switch 242 is turned on, the power reception-side capacitance for determining the resonant frequency of the resonant circuit RR is the combined capacitance described above. Here, it is assumed that when the switch 242 is turned on, the frequency $f_M$ is separated from the reference frequency such that the resonant circuit RR does not function as the load for the power transmission-side coil $T_L$ (that is, such that magnetic field resonance is not sufficiently produced between the resonant circuits TT and RR). For example, the resonant frequency (that is, the frequency $f_M$) of the resonant circuit RR when the switch 242 is turned on is set to several hundred kHz to 1 MHz.

As long as the resonant frequency of the resonant circuit RR can be changed to the frequency $f_M$, the resonant frequency change circuit serving as the change circuit 240 is not limited to the resonant frequency change circuit 240A, and the frequency $f_M$ may be higher than the reference frequency. In other words, with consideration given to the fact that the power reception-side resonant circuit RR can be a series resonant circuit, the following can be said. The power reception-side resonant circuit RR includes the parallel circuit or the series circuit of the power reception-side coil ($R_L$) and the power reception-side capacitance, and the power reception-side capacitance coincides with a predetermined reference capacitance, the resonant frequency $f_O$ of the power reception-side resonant circuit RR coincides with the reference frequency. The resonant frequency change circuit increases or decreases the power reception-side capacitance from the reference capacitance with necessary timing. In this way, in the power reception-side resonant circuit RR, the parallel circuit or the series circuit is formed with the power reception-side coil ($R_L$) and the power reception-side capacitance which is higher or lower than the reference capacitance, with the result that the resonant frequency $f_O$ of the power reception-side resonant circuit RR is changed from the reference frequency.

A coil short circuit 240B in FIG. 10 is an example of the coil short circuit serving as the resonant state change circuit 240. The coil short circuit 240B is formed with a switch 243 that is connected (inserted) between a node to which the one end of the capacitor $R_C$ and one end of the coil $R_L$ in the resonant circuit RR are connected in common and a node to which the other end of the capacitor $R_C$ and the other end of the coil $R_L$ in the resonant circuit RR are connected in common. The switch 243 is turned on or off under control of the control circuit 250. When the switch 243 is turned on, the coil $R_L$ in the resonant circuit RR is short-circuited (more specifically, both ends of the coil $R_L$ are short-circuited). In a state where the power reception-side coil $R_L$ is short-circuited, the power reception-side resonant circuit RR is not present (a state equivalent to the state where the power reception-side resonant circuit RR is not present is entered). Hence, while the power reception-side coil $R_L$ is being short-circuited, the load for the power transmission-side coil $T_L$ is sufficiently reduced (that is, a state as if the electronic device 2 were not present on the power feeding stage 12 is entered). As long as the power reception-side coil $R_L$ can be short-circuited, the coil short circuit serving as the change circuit 240 is not limited to the coil short circuit 240B.

In the following description, an operation of changing the resonant frequency $f_O$ of the power reception-side resonant circuit RR from the reference frequency to the predetermined frequency $f_M$ is referred to as a resonant frequency change operation, and an operation of short-circuiting the power reception-side coil $R_L$ with the coil short circuit is referred to as a coil short circuit operation. For simplification of description, the resonant frequency change operation or the coil short circuit operation is also referred to as an $f_O$ change/short circuit operation.

The control circuit 250 (see FIG. 5) comprehensively controls the operations of the individual portions within the IC 200. The control performed by the control circuit 250 includes, for example, control on the switching operation of the switching circuit 210, control on the details of the communication operation and the power reception operation of the communication circuit 220 and the power reception circuit 230 and control on whether or not the operations are performed and control on the operation of the change circuit 240. The control circuit 250 incorporates a timer (unillustrated), and thereby can measure the length of a time between arbitrary timings. As an example, the timer in the control circuit 250 can measure a time during which the changing of the resonant frequency $f_O$ to the predetermined frequency $f_M$ by the $f_O$ change/short circuit operation or the short-circuiting of the power reception-side coil $R_L$ is maintained (that is, the measurement of a time $T_{M1}$ which will be described later; see step S207 in FIG. 20).

Incidentally, the control circuit 160 of the power feeding device 1 determines whether or not a foreign object is present on the power feeding stage 12, and can control the power transmission circuit 130 such that only when the foreign object is not present, the power transmission operation is performed. The foreign object in the present embodiment includes an object which differs from the electronic device 2 or its constituent elements (such as the power reception-side coil $R_L$) and in addition in which, when it is brought close to the power feeding device 1, an electric current (an electric current inside the foreign object) can be generated based on the magnetic field generated in the power transmission-side coil $T_L$. In the present embodiment, the presence of the foreign object may be interpreted so as to mean that the foreign object is present in such a position that an unignorable current based on the magnetic field generated in the power transmission-side coil $T_L$ flows within the foreign object. The current flowing within the foreign object based on the magnetic field generated in the power transmission-side coil $T_L$ generates an electromotive force (or a counter electromotive force) in the coil ($T_L$ or $R_L$) which is opposite the foreign object and is coupled thereto, with the result that the current can exert an unignorable influence on the properties of the circuit including the coil.

FIG. 11A shows a schematic outline view of a foreign object 3 which is one type of foreign object, and FIG. 11B shows a schematic internal configuration diagram of the foreign object 3. The foreign object 3 includes a resonant circuit JJ which is formed with a parallel circuit of a coil $J_L$ and a capacitor $J_C$ and a foreign object internal circuit 300 which is connected to the resonant circuit JJ. The resonant frequency of the resonant circuit JJ is set to the reference frequency. Unlike the electronic device 2, the foreign object 3 is a device which does not correspond to the power feeding device 1. For example, the foreign object 3 is an object (such as a non-contact IC card) which includes a wireless IC tag having an antenna coil (the coil $J_L$) of 13.56 MHz that does not respond to the NFC communication. For example, the foreign object 3 is also an electronic device which has an NFC communication function itself but in which the function is disabled. For example, a smart phone which has the NFC communication function but in which the function is turned off by a software setting can be the foreign object 3. A smart phone in which the NFC communication function is enabled but which does not have a power reception function is also classified as the foreign object 3.

If in a state where the foreign object 3 described above is arranged on the power feeding stage 12, the power feeding device 1 performs the power transmission operation, the foreign object 3 may be destroyed by a strong magnetic field (for example, a magnetic field having a magnetic field intensity of 12 A/m or more) generated in the power transmission-side coil $T_L$. For example, the strong magnetic field at the time of the power transmission operation may increase the terminal voltage of the coil $J_L$ in the foreign object 3 on the power feeding stage 12 to 100 to 200V, and unless a foreign object 3 which can withstand such a high voltage is formed, the foreign object 3 is destroyed. Hence, the power transmission control through the detection of whether or not the foreign object is present is important.

[pFOD Processing (Foreign Object Detection Processing Before Power Transfer)]

Foreign object detection processing for detecting whether or not the foreign object is present will be described with reference to FIG. 12. FIG. 12 is a flowchart of the foreign object detection processing (hereinafter referred to as pFOD processing) which is performed by the power feeding device 1 before the power transfer.

When the pFOD processing is performed, the power transmission circuit 130 is connected to the resonant circuit TT. In the pFOD processing, the control circuit 160 first controls, in step S11, the power transmission circuit 130 so as to supply, to the resonant circuit TT, a pFOD alternating current voltage having a predetermined magnitude. The magnitude (amplitude) of the pFOD alternating current voltage is smaller than that of the power transmission alternating current voltage supplied by the power transmission circuit 130 to the resonant circuit TT in the power transmission operation. For example, twice the wave peak value of the power transmission alternating current voltage is assumed to be about 70V. On the other hand, twice the wave peak value of the pFOD alternating current voltage is assumed to be about 10V. A pFOD magnetic field is generated in the power transmission-side coil $T_L$ by the supply of the pFOD alternating current voltage to the resonant circuit TT. The pFOD magnetic field is an alternating magnetic field which has a predetermined magnetic field intensity and which oscillates at the reference frequency. The magnetic field intensity of the pFOD magnetic field is considerably smaller than the magnetic field intensity of the power transmission magnetic field (for example, 45 to 60 A/m) generated in the power transfer (that is, the power transmission operation), and falls within a range from a lower limit value of "1.5 A/m" to an upper limit value of "7.5 A/m" in the intensity of the magnetic field generated at the time of the NFC communication. Hence, the foreign object 3 is prevented from being subjected to destruction or the like by the pFOD magnetic field or is unlikely to be subjected thereto. In FIG. 7, the voltage supplied by the power transmission circuit 130 to the resonant circuit TT may be interpreted to be an alternating current voltage between the lines 134 and 135 or a voltage applied to the capacitor Tc.

In step S12 subsequent to step S11, the control circuit 160 uses the load detection circuit 140 so as to acquire, as a current amplitude detection value $V_{pFOD}$, the voltage value $V_{DET}$ when the pFOD magnetic field is generated. The current amplitude detection value $V_{pFOD}$ has a value corresponding to the amplitude of the current flowing through the power transmission-side coil $T_L$ when the pFOD magnetic field is generated in the power transmission-side coil $T_L$. During a period in which the pFOD processing is performed, according to an instruction from the power feeding device 1 through the NFC communication, in the electronic device 2, the $f_O$ change/short circuit operation (the resonant frequency change operation or the coil short circuit operation) is performed. Hence, the resonant circuit RR (the power reception-side coil $R_L$) does not substantially function as a load for the power transmission-side coil $T_L$, and thus the current amplitude detection value $V_{pFOD}$ is prevented from being reduced at all or is hardly reduced.

In step S13 subsequent to step S12, the control circuit 160 determines whether or not the current amplitude detection value $V_{pFOD}$ falls within a predetermined pFOD normal range. Then, when the current amplitude detection value $V_{pFOD}$ falls within the pFOD normal range, the control circuit 160 determines that the foreign object 3 is not present on the power feeding stage 12 (step S14). This determination is referred to as a foreign object absence determination. On the other hand, when the current amplitude detection value $V_{pFOD}$ falls outside the pFOD normal range, the control circuit 160 determines that the foreign object 3 is present on the power feeding stage 12 (step S15). This determination is referred to as a foreign object presence determination. When the foreign object absence determination is made, the control circuit 160 determines that the power transmission operation can be performed by the power transmission circuit 130 so as to allow the performance of the power transmission operation (the power transmission using the resonant circuit TT) whereas when the foreign object presence determination is made, the control circuit 160 determines that the power transmission operation cannot be performed by the power transmission circuit 130 so as to restrict (prohibit) the performance of the power transmission operation. However, even when the foreign object absence determination is made, the performance of the power transmission operation may be restricted (prohibited) depending on the result of power reception proper determination processing which will be described later.

The pFOD normal range is a range which is equal to or more than a predetermined lower limit value $V_{pREFL}$ but equal to or less than a predetermined upper limit value $V_{pREFH}$ ($0<V_{pREFL}<V_{pREFH}$). Hence, when a determination inequality "$V_{pREFL} \leq V_{pFOD} \leq V_{pREFH}$" is satisfied, the foreign object absence determination is made whereas when the determination inequality is not satisfied, the foreign object presence determination is made.

In a case where the foreign object 3 is present on the power feeding stage 12 when the pFOD processing is performed, the resonant circuit JJ (the coil $J_L$) of the foreign object 3 functions as a load for the power transmission-side coil $T_L$, with the result that as compared with a case where the foreign object 3 is not present on the power feeding stage 12, the current amplitude detection value $V_{pFOD}$ is reduced.

As the foreign object, a foreign object 3a (unillustrated) which is different from the foreign object 3 can also be considered. The foreign object 3a is, for example, a metal object (an aluminum foil or an aluminum plate) which is formed so as to contain aluminum or a metal object which is formed so as to contain copper. In a case where the foreign object 3a is present on the power feeding stage 12 when the pFOD processing is performed, as compared with a case where the foreign object 3a is not present on the power feeding stage 12, the current amplitude detection value $V_{pFOD}$ is increased by electrical and magnetic action.

Before the power transfer is performed, the lower limit value $V_{pREFL}$ and the upper limit value $V_{pREFH}$ are previously set and stored in the memory 150 through experiments and/or theoretical calculation such that when the foreign object 3 is present on the power feeding stage 12, the current amplitude detection value $V_{pFOD}$ falls below the lower limit value $V_{pREFL}$, that when the foreign object 3a is present on the power feeding stage 12, the current amplitude detection value $V_{pFOD}$ exceeds the upper limit value $V_{pREFH}$ and that when the foreign object (3 or 3a) is not present on the power feeding stage 12, the current amplitude detection value $V_{pFOD}$ falls within the pFOD normal range.

When the power transmission magnetic field is generated in a state where the foreign object 3a is present on the power feeding stage 12, power may be absorbed by the foreign object 3a, and thus the foreign object 3a may generate heat. In the present embodiment, since it is assumed that the reference frequency serving as a carrier frequency in the power transfer is 13.56 MHz, it can be said that it is highly unlikely that the foreign object 3a generates heat. Hence, a configuration may be adopted in which without any consideration being given to the presence of the foreign object 3a, only when the current amplitude detection value $V_{pFOD}$ falls below the lower limit value $V_{pREFL}$, the foreign object presence determination is made, and in which when the current amplitude detection value $V_{pFOD}$ is equal to or more than the lower limit value $V_{pREFL}$, the foreign object absence determination is constantly made (in other words, the upper limit value $V_{pREFH}$ may be abolished). However, in the invention according to the present embodiment, the reference frequency is not limited to 13.56 MHz, and when the reference frequency is set to, for example, several hundred kHz, it is highly likely that the foreign object 3a generates heat, with the result that it is preferable to adopt the above method in which not only the lower limit value $V_{pREFL}$ but also the upper limit value $V_{pREFH}$ is determined to be within the pFOD normal range.

Consider first to fourth cases on the detection of the foreign object 3 with reference to FIG. 13A to FIG. 13D. In the first case, only the electronic device 2 is present on the power feeding stage 12. In the second case, the electronic device 2 and the foreign object 3 are present on the power feeding stage 12. In the third case, only the foreign object 3 is present on the power feeding stage 12. In the fourth case, neither the electronic device 2 nor the foreign object 3 is present on the power feeding stage 12.

Since as described previously, during the period in which the pFOD processing is performed, in the electronic device 2, the $f_O$ change/short circuit operation is performed, in the first case, the load for the power transmission-side coil $T_L$ is sufficiently reduced (that is, the state as if the electronic device 2 were not present on the power feeding stage 12 is entered), and thus the current amplitude detection value $V_{pFOD}$ is sufficiently increased, with the result that the foreign object absence determination is made. On the other hand, in the second case, although the resonant frequency of the resonant circuit RR is changed to the frequency $f_M$ or the power reception-side coil $R_L$ is short-circuited, since the foreign object 3 continues to be present as the load for the power transmission-side coil $T_L$ (since the resonant frequency of the resonant circuit JJ in the foreign object 3 remains the reference frequency), the current amplitude detection value $V_{pFOD}$ is sufficiently decreased, with the result that the foreign object presence determination is made.

In the third and fourth cases, since the electronic device 2 which responds to the NFC communication is not present on the power feeding stage 12, the power transmission operation is not necessary in the first place, and thus the pFOD processing itself is not performed. The power feeding device 1 can determine whether or not the electronic device 2 which can handle the power transfer is present on the power feeding stage 12 by the NFC communication. The state where the foreign object 3 is present on the power feeding stage 12 is not limited to a state where the foreign object 3 is in direct contact with the power feeding stage 12. For example, as shown in FIG. 14, a state where the electronic device 2 is present so as to be in direct contact with the top of the power feeding stage 12 and where the foreign object 3 is present on the electronic device 2 also belongs to the state where the foreign object 3 is present on the power feeding stage 12 as long as the foreign object presence determination is made.

[Power Reception Proper Determination Processing]

Then, consider conditions in which the electronic device 2 is present in a position slightly away from the power feeding stage 12 as shown in FIG. 15. For example, when the user of the electronic device 2 grasps the electronic device 2 above the power feeding stage 12 or when the user sandwiches a book or the like between the power feeding stage 12 and the electronic device 2, the electronic device 2 is present in a position slightly away from the power feeding stage 12. When under such conditions, a distance between the power feeding device 1 and the electronic device 2 is long enough to prevent the performance of the NFC communication, the conditions can be considered to be equivalent to the separate state of FIG. 1A, and thus there is no problem because the power transmission operation is not started (because the power transmission operation is performed only after the NFC communication, which will be described later). However, a case where the distance between the power feeding device 1 and the electronic device 2 cannot be said to be appropriate for the power transfer but where the distance is short enough to allow the NFC communication can be considered, and when in such a case, the power transmission operation is performed, in a state where a power transfer efficiency is considerably low (that is, in an undesirable state), the power transfer is performed, and part of the power transmitted from the power feeding device 1 which cannot be received in the electronic device 2 is radiated as a large amount of unnecessary radiation.

With consideration given to this case, the power feeding device 1 performs, before the performance of the power transmission operation, separately of the pFOD processing described above, the power reception proper determination processing for determining whether or not proper power reception can be performed by the electronic device 2.

Figure 16:
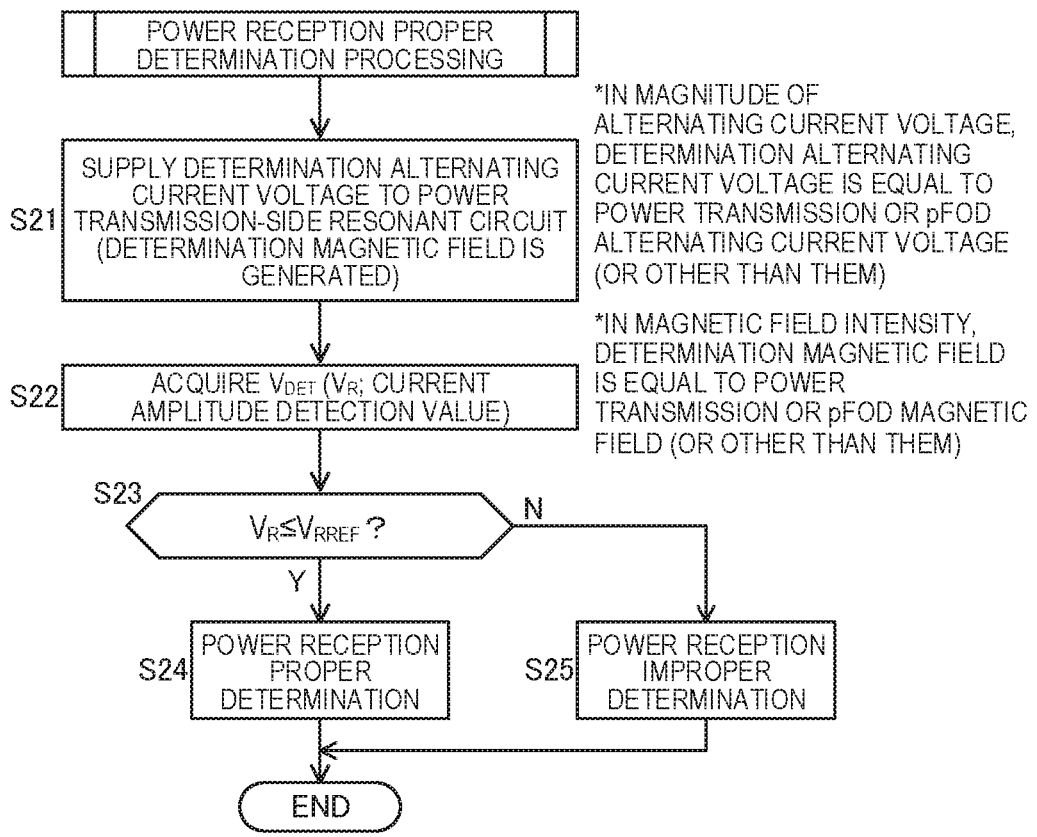
FIG. 16 is an operational flowchart of power reception proper determination processing performed in the power feeding device.

FIG. 16 is a flowchart of the power reception proper determination processing. The power reception proper determination processing is performed when the power feeding device 1 and the electronic device 2 are in the power feeding connection state. Specifically, in a state where in the power feeding device 1, the power transmission circuit 130 is connected to the resonant circuit TT and where in the electronic device 2, the resonant circuit RR is connected to the power reception circuit 230, the power reception proper determination processing is performed. When the power reception proper determination processing is performed, the $f_O$ change/short circuit operation is not performed in the electronic device 2, and thus the resonant frequency of the resonant circuit RR is the reference frequency. In other words, the power reception proper determination processing is performed in the same state as when the power transfer is performed.

In the power reception proper determination processing, the control circuit 160 first controls, in step S21, the power transmission circuit 130 so as to supply, to the resonant circuit TT, a determination alternating current voltage having a predetermined magnitude. In this way, a determination magnetic field is generated in the power transmission-side coil $T_L$. The determination magnetic field is an alternating magnetic field which has a predetermined magnetic field intensity and which oscillates at the reference frequency.

In the magnitude (amplitude) of the alternating current voltage, the determination alternating current voltage may be equal to the power transmission alternating current voltage supplied by the power transmission circuit 130 to the resonant circuit TT in the power transmission operation, may be equal to the pFOD alternating current voltage supplied by the power transmission circuit 130 to the resonant circuit TT in the pFOD processing or may be different from them. The magnitude of the determination alternating current voltage is made equal to that of the power transmission alternating current voltage, and thus the magnetic field intensity of the determination magnetic field is made equal to that of the power transmission magnetic field. The magnitude of the determination alternating current voltage is made equal to that of the pFOD alternating current voltage, and thus the magnetic field intensity of the determination magnetic field is made equal to that of the pFOD magnetic field. The magnitude of the determination alternating current voltage is made different from the magnitudes of the power transmission alternating current voltage and the pFOD alternating current voltage, and thus the magnetic field intensity of the determination magnetic field is made different from the magnetic field intensities of the power transmission magnetic field and the pFOD magnetic field.

Preferably, although details will be described later, in the pFOD processing and the power reception proper determination processing, the pFOD processing is previously performed, and only after the foreign object absence determination is made in the pFOD processing, the power reception proper determination processing is performed. In this way, the power reception proper determination processing is performed only when the foreign object is determined not to be present on the power feeding stage 12, and thus for example, even when the magnetic field intensity of the determination magnetic field is increased to the magnetic field intensity of the power transmission magnetic field, the foreign object is prevented from being subjected to destruction or the like.

In step S22 subsequent to step S21, the control circuit 160 uses the load detection circuit 140 so as to acquire, as a current amplitude detection value $V_R$, the voltage value $V_{DET}$ when the determination magnetic field is generated. The current amplitude detection value $V_R$ has a value corresponding to the amplitude of the current flowing through the power transmission-side coil $T_L$ when the determination magnetic field is generated in the power transmission-side coil $T_L$.

In step S23 subsequent to step S22, the control circuit 160 compares the current amplitude detection value $V_R$ with a predetermined determination reference value $V_{RREF}$. Then, when "$V_R \leq V_{RREF}$" holds true, the control circuit 160 determines that the proper power reception can be performed in the electronic device 2 (step S24). This determination is referred to as a power reception proper determination. On the other hand, when "$V_R \leq V_{RREF}$" does not hold true, the control circuit 160 determines that the proper power reception cannot be performed in the electronic device 2 (step S25). This determination is referred to as a power reception improper determination. When the power reception proper determination is made, the control circuit 160 determines that the power transmission operation can be performed by the power transmission circuit 130 so as to allow the performance of the power transmission operation (the power transmission using the resonant circuit TT) whereas when the power reception improper determination is made, the control circuit 160 determines that the power transmission operation cannot be performed by the power transmission circuit 130 so as to restrict (prohibit) the performance of the power transmission operation. When the pFOD processing and the power reception proper determination processing are combined, only if the foreign object absence determination is made in the pFOD processing and the power reception proper determination is made in the power reception proper determination processing, the performance of the power transmission operation is allowed whereas if the foreign object presence determination or the power reception improper determination is made, the performance of the power transmission operation is restricted (prohibited).

Power received by the power reception-side coil $R_L$ when the electronic device 2 is placed on the power feeding stage 12 such that the power received by the power reception-side coil $R_L$ is maximized when the power transmission operation is performed is referred to as maximum receivable power.

That the proper power reception can be performed in the electronic device 2 indicates that when the power transmission operation is performed, power which is $k_z$ times or more as high as the maximum receivable power is received in the power reception-side coil $R_L$. Here, $k_z$ is a predetermined positive value which is less than 1, and may be selected from a range of, for example, 0.25 to 0.75.

When the electronic device 2 is present within a predetermined power transfer possible region including a position in which the power received by the power reception-side coil $R_L$ is the maximum receivable power, "$V_R \leq V_{RREF}$" holds true, and when the electronic device 2 is present outside the predetermined power transfer possible region, "$V_R \leq V_{RREF}$" does not hold true. Hence, it can be said that that the proper power reception can be performed in the electronic device 2 is equivalent to that the electronic device 2 is present within the predetermined power transfer possible region, and that that the proper power reception cannot be performed in the electronic device 2 is equivalent to that the electronic device 2 is present outside the predetermined power transfer possible region.

The presence of the electronic device 2 within the power transfer possible region specifically means that the center or barycenter of the electronic device 2 or the center or barycenter of the power reception-side coil $R_L$ is located within the power transfer possible region, and the presence of the electronic device 2 outside the power transfer possible region specifically means that the center or barycenter of the electronic device 2 or the center or barycenter of the power reception-side coil $R_L$ is located outside the power transfer possible region. Hence, the power reception proper determination processing can also be said to be processing for determining whether or not the electronic device 2 or the power reception-side coil $R_L$ is present within the predetermined power transfer possible region.

Preferably, with consideration given to the value of $k_z$, as necessary, through experiments and/or theoretical calculation, the determination reference value $V_{RREF}$ is previously determined and stored in the memory 150.

Control on the performance of the power transmission operation is performed through the power reception proper determination processing described above, and thus the performance of the power transmission operation under conditions in which only improper power reception is performed is reduced, with the result that it is possible to reduce the generation of a large amount of unnecessary radiation and useless power consumption.

Figure 17:
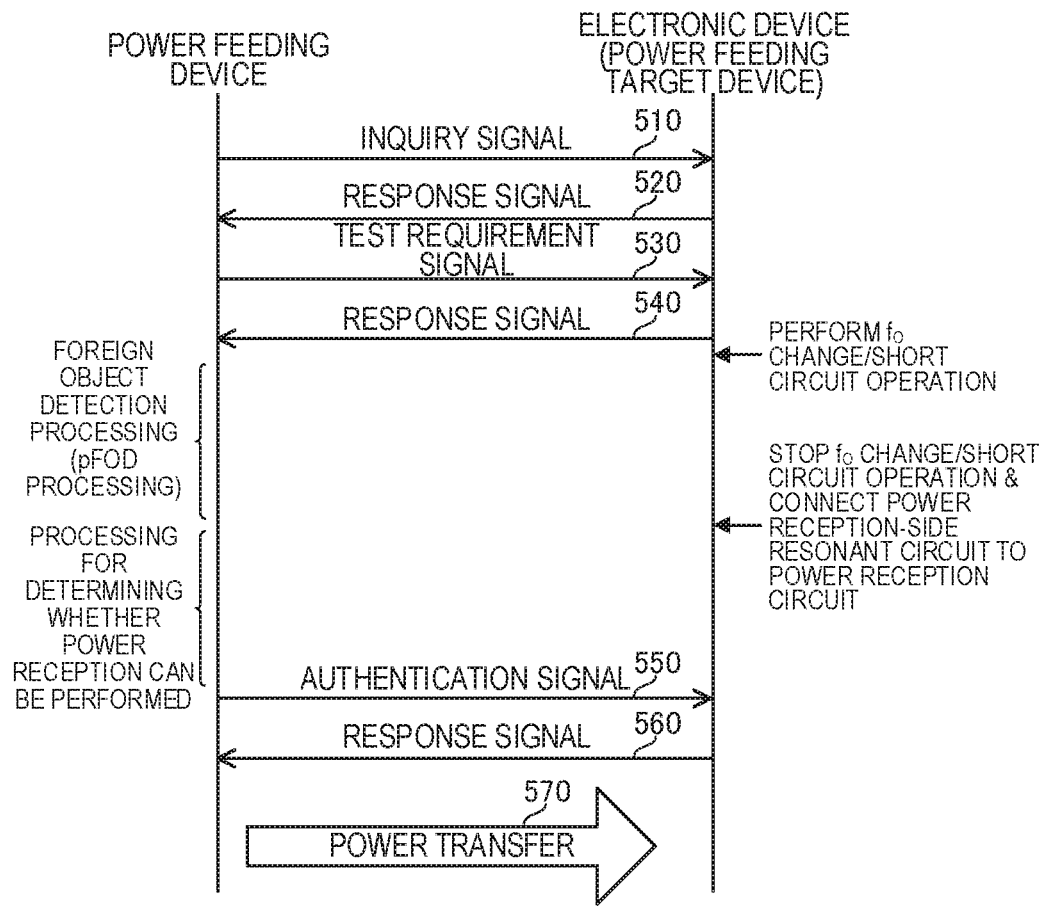
FIG. 17 is a diagram illustrating the exchange of signals between the power feeding device and the electronic device according to the embodiment of the present invention.

[Exchange of Signals Until Power Transfer: FIG. 17]

Figure 18:
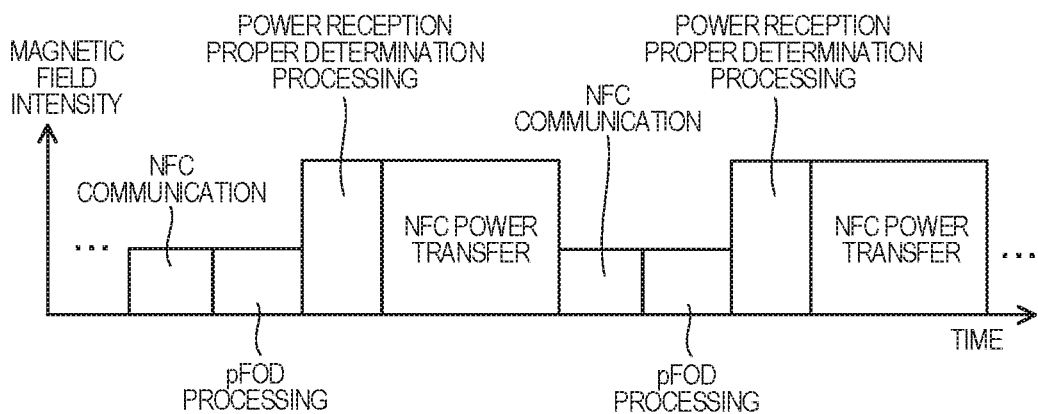
FIG. 18 is a diagram showing how NFC communication, pFOD processing, the power reception proper determination processing and the power transfer are sequentially and repeatedly performed according to the embodiment of the present invention.

The exchange of signals between the devices 1 and 2 until the power transfer is performed will be described with reference to FIG. 17. In FIG. 17 and FIG. 18 which will be described later, it is assumed that the electronic device 2 is present on the power feeding stage 12 in the reference arrangement state (FIG. 1B) (hence, the proper power reception can be performed in the electronic device 2), and that the foreign object is not present on the power feeding stage 12.

First, the power feeding device 1 serves as the transmission side and the electronic device 2 serves as the reception side, and the power feeding device 1 (the IC 100) transmits, by the NFC communication, an inquiry signal 510 to a device on the power feeding stage 2 (hereinafter also referred to as a power feeding target device). The power feeding target device includes the electronic device 2, and can include the foreign object 3. The inquiry signal 510 includes, for example, a signal for inquiring the unique identification information of the power feeding target device, a signal for inquiring whether the power feeding target device is in a state where the power feeding target device can perform the NFC communication and a signal for inquiring whether the power feeding target device can receive power or the power feeding target device requires the transmission of power.

The electronic device 2 (the IC 200) which receives the inquiry signal 510 transmits, by the NFC communication, to the power feeding device 1, a response signal 520 for responding to the details of the inquiry in the inquiry signal 510. The power feeding device 1 (the IC 100) which receives the response signal 520 analyzes the response signal 520, and when the power feeding target device can perform the NFC communication and can receive power or requires the transmission of power, the power feeding device 1 transmits a test requirement signal 530 to the power feeding target device by the NFC communication. The electronic device 2 (the IC 200) serving as the power feeding target device which receives the test requirement signal 530 transmits a response signal 540 for the test requirement signal 530 to the power feeding device 1 by the NFC communication, and then immediately performs the $f_O$ change/short circuit operation (the resonant frequency change operation or the coil short circuit operation). The test requirement signal 530 is, for example, a signal for requiring the performance of the $f_O$ change/short circuit operation or providing an instruction to perform it, and the control circuit 250 of the electronic device 2 makes the resonant state change circuit 240 perform the $f_O$ change/short circuit operation by being triggered by the reception of the test requirement signal 530. Before the reception of the test requirement signal 530, the $f_O$ change/short circuit operation is not performed. As long as the test requirement signal 530 triggers the performance of the $f_O$ change/short circuit operation, any signal may be used as the test requirement signal 530, and the test requirement signal 530 may be included in the inquiry signal 510.

The power feeding device 1 (the IC 100) which receives the response signal 540 performs the pFOD processing described previously. During the period in which the pFOD processing is performed, the electronic device 2 (the IC 200) continues to perform the $f_O$ change/short circuit operation. Specifically, the electronic device 2 (the IC 200) uses the internal timer so as to maintain the performance of the $f_O$ change/short circuit operation only for a time corresponding to the length of a period in which the pFOD processing is performed, and then stops the $f_O$ change/short circuit operation. Immediately after the electronic device 2 stops the $f_O$ change/short circuit operation, the electronic device 2 connects the resonant circuit RR to the reception circuit 230.

When in the pFOD processing, it is determined that the foreign object is not present on the power feeding stage 12, the power feeding device 1 (the IC 100) performs the power reception proper determination processing after the pFOD processing. Then, when the power reception proper determination is made in the power reception proper determination processing, an authentication signal 550 is transmitted by the NFC communication to the power feeding target device. The authentication signal 550 includes, for example, a signal for notifying the power feeding target device of the fact that the power transmission is performed from now. After the stop of the $f_O$ change/short circuit operation, and after the resonant circuit RR is connected to the power reception circuit 230, when a time corresponding to the length of a period during which the power reception proper determination processing is performed has elapsed, the electronic device 2 connects the resonant circuit RR to the communication circuit 220 so as to be on standby for the reception of the authentication signal 550. The electronic device 2 (the IC 200) which receives the authentication signal 550 transmits the response signal 560 corresponding to the authentication signal 550 to the power feeding device 1 by the NFC communication. The response signal 560 includes, for example, a signal for providing a notification that the details indicated by the authentication signal 550 are recognized or a signal for allowing the details indicated by the authentication signal 550. The power feeding device 1 (the IC 100) which receives the response signal 560 connects the power transmission circuit 130 to the resonant circuit TT so as to perform the power transmission operation, with the result that power transfer 570 is realized.

Although in the first case of FIG. 13A, the power transfer 570 is performed by the procedure described above, in the second case of FIG. 13B, the processing proceeds up to the transmission and reception of the response signal 540 but in the pFOD processing, it is determined that the foreign object is present on the power feeding stage 12, with the result that the power transfer 570 is not performed. Even when as shown in FIG. 15, the foreign object is not present on the power feeding stage 12 but the electronic device 2 is separated from the power feeding stage 12 to a certain degree such that even when the power reception improper determination is made, the power transfer 570 is not performed. One round of the power transfer 570 may be performed only for a predetermined time. A series of processing steps from the transmission of the inquiry signal 510 to the power transfer 570 may be repeatedly performed. In actuality, as shown in FIG. 18, the NFC communication, the pFOD processing, the power reception proper determination processing and the power transfer (NFC power transfer) can be performed sequentially and repeatedly (however, it is assumed that the foreign object absence determination and the power reception proper determination are made). In other words, in the non-contact power feeding system, the NFC communication, the pFOD processing, the power reception proper determination processing and the power transfer can be sequentially and repeatedly performed in a time division manner (however, it is assumed that the foreign object absence determination and the power reception proper determination are made). Although in FIG. 18, it is assumed that the magnetic field intensity of the determination magnetic field generated in the power reception proper determination processing is equal to that of the power transmission magnetic field in the power transfer, the former magnetic field intensity may be lower than the latter magnetic field intensity.

If a communication possible region in which the NFC communication can be performed is included in the power transfer possible region described above, when the exchange of the signals 510 to 540 can be performed, it is determined that the electronic device 2 is located within the power transfer possible region. Hence, when it is assumed that the non-contact power feeding system can be formed such that the power transfer possible region includes the communication possible region, the power reception proper determination processing is not necessary. However, it can be considered that depending on various types of design parameters, the communication possible region is often wider than the power transfer possible region. When the non-contact power feeding system is formed as a so-called open system, that is, when a plurality of designers and manufacturers can form, as the power feeding device 1, various power feeding devices whose shapes and properties differ from each other and can form, as the electronic device 2, various electronic devices whose shapes and properties differ from each other, it can be considered that it is not easy to require that in each of the combinations of the power feeding devices and the electronic devices, the communication possible region be included in the power transfer possible region.

[Operational Flowchart of Power Feeding Device and Electronic Device]

Figure 19:
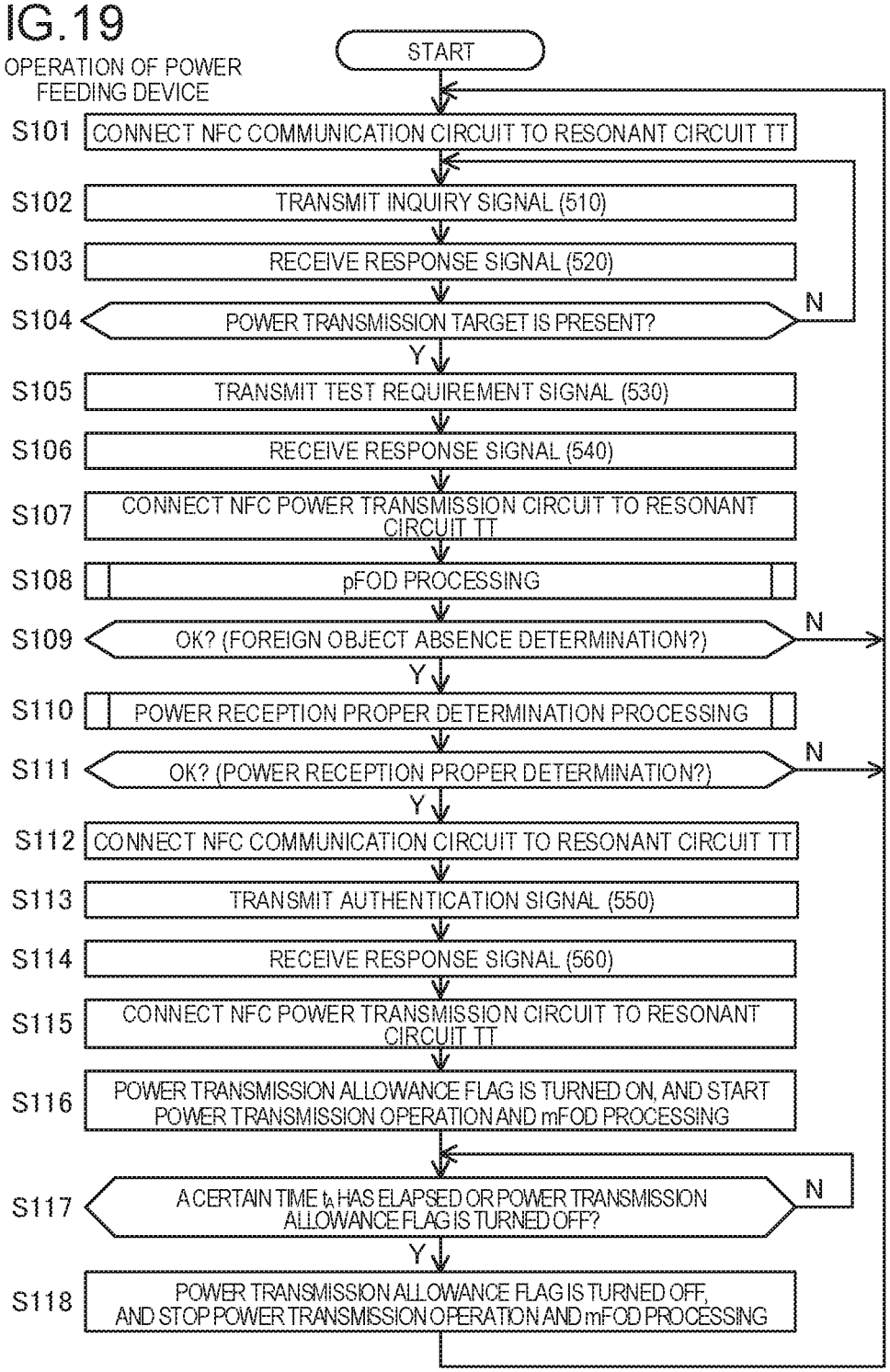
FIG. 19 is an operational flowchart of the power feeding device according to the embodiment of the present invention.

The flow of the operation of the power feeding device 1 will then be described. FIG. 19 is an operational flowchart of the power feeding device 1. The operations of the communication circuit 120 and the power transmission circuit 130 are performed under control of the control circuit 160.

When the power feeding device 1 is started up, in step S101, the control circuit 160 first connects the communication circuit 120 to the resonant circuit TT through the control of the switching circuit 110. Then, in step S102 subsequent thereto, the control circuit 160 transmits the inquiry signal 510 to the power feeding target device by the NFC communication using the communication circuit 120 and the resonant circuit TT, and is thereafter, in step S103, on standby for the reception of the response signal 520. When the response signal 520 is received in the communication circuit 120, the control circuit 160 analyzes the response signal 520, and when the power feeding target device can perform the NFC communication and can receive power or requires the transmission of power, the control circuit 160 determines that the power transmission target is present (Y in step S104), and the process proceeds to step S105, otherwise (N in step S104), the process returns to step S102.

In step S105, the control circuit 160 transmits the test requirement signal 530 to the power feeding target device by the NFC communication using the communication circuit 120 and the resonant circuit TT, and is thereafter, in step S106, on standby for the reception of the response signal 540. When the response signal 540 is received in the communication circuit 120, in step S107, the control circuit 160 connects the power transmission circuit 130 to the resonant circuit TT through the control of the switching circuit 110, and then performs, in step S108 subsequent thereto, the pFOD processing described previously. Thereafter, when in step S109, the result of the pFOD processing is checked, and the foreign object presence determination is made in the pFOD processing, the process returns to step S101 whereas when the foreign object absence determination is made, the process proceeds to step S110. In step S110, the power reception proper determination processing described previously is performed. Thereafter, when in step S111, the result of the power reception proper determination processing is checked, and the power reception improper determination is made in the power reception proper determination processing, the process returns to step S101 whereas when the power reception proper determination is made, the process proceeds to step S112. In step S112, the control circuit 160 connects the communication circuit 120 to the resonant circuit TT through the control of the switching circuit 110, and the process proceeds to step S113.

In step S113, the control circuit 160 transmits the authentication signal 550 to the power feeding target device by the NFC communication using the communication circuit 120 and the resonant circuit TT, and is thereafter, in step S114, on standby for the reception of the response signal 560. When the response signal 560 is received in the communication circuit 120, in step S115, the control circuit 160 connects the power transmission circuit 130 to the resonant circuit TT through the control of the switching circuit 110, and then the process proceeds to step S116.

The control circuit 160 sets, in step S116, a power transmission allowance flag on, and starts the power transmission operation and mFOD processing, and thereafter the process proceeds to step S117. Although details will be described later, whether or not the foreign object is present in the power transfer is detected by the mFOD processing, and when the foreign object is detected, the power transmission allowance flag is turned off. The control circuit 160 measures the time which has elapsed since the start of the power transmission operation, and in step S117, compares the elapsed time with a predetermined time $t_A$ (for example, 10 minutes) and checks the state of the power transmission allowance flag. When the elapsed time reaches the predetermined time $t_A$ or when the power transmission allowance flag is set off by the mFOD processing, the process proceeds to step S118. In step S118, the control circuit 160 switches the power transmission allowance flag from on to off or keeps the power transmission allowance flag off, and stops the power transmission operation and the mFOD processing, and thereafter the process returns to step S101.

Figure 20:
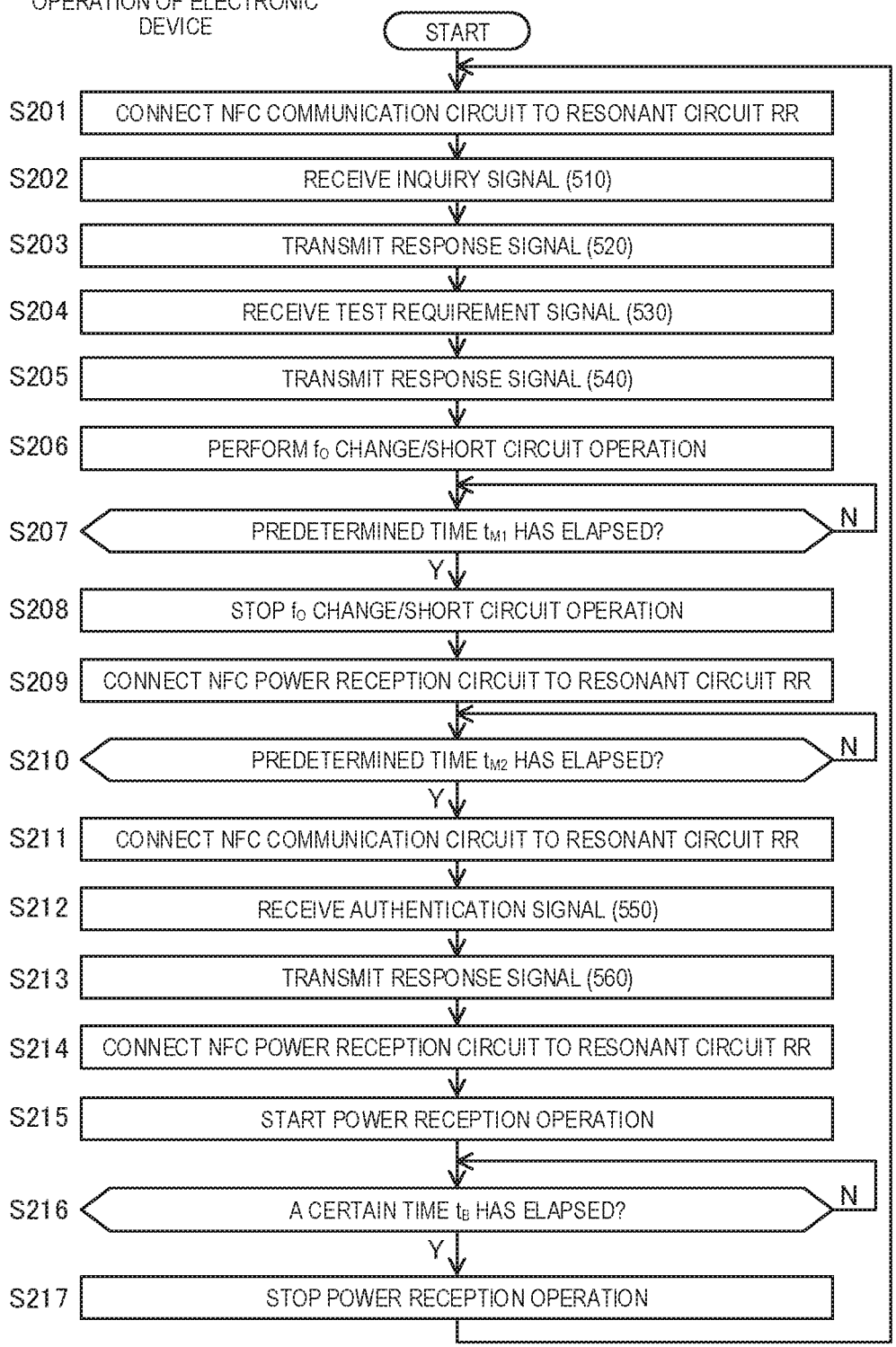
FIG. 20 is an operational flowchart of the electronic device which is operated according to the operation of FIG. 19.

The flow of the operation of the electronic device 2 will then be described. FIG. 20 is an operational flowchart of the electronic device 2, and the processing starting from step S201 is performed as the operation of the power feeding device 1 shown in FIG. 19 is performed. The operations of the communication circuit 220 and the power reception circuit 230 are performed under control of the control circuit 250.

When the electronic device 2 is started up, in step S201, the control circuit 250 first connects the communication circuit 220 to the resonant circuit RR through the control of the switching circuit 210. When the electronic device 2 is started up, the $f_O$ change/short circuit operation is not performed. Then, in step S202 subsequent thereto, the control circuit 250 uses the communication circuit 220 so as to be on standby for the reception of the inquiry signal 510. When the inquiry signal 510 is received in the communication circuit 220, in step S203, the control circuit 250 analyzes the inquiry signal 510 so as to generate the response signal 520, and transmits the response signal 520 to the power feeding device 1 by the NFC communication using the communication circuit 220. Here, when the control circuit 250 checks the state of the battery 21, then the battery 21 is not fully charged and an abnormality is not recognized in the battery 21, the control circuit 250 includes, in the response signal 520, a signal which can receive power or requires the transmission of power. On the other hand, when the battery 21 is fully charged or an abnormality is recognized in the battery 21, the control circuit 250 includes, in the response signal 520, a signal indicating that it is impossible to receive power.

Then, when in step S204 subsequent thereto, the test requirement signal 530 is received in the communication circuit 220, the process proceeds to step S205. In step S205, the control circuit 250 transmits the response signal 540 to the power feeding device 1 by the NFC communication using the communication circuit 220, and then in step S206 subsequent thereto, uses the resonant state change circuit 240 so as to perform the $f_O$ change/short circuit operation. In other words, the resonant frequency $f_O$ is changed from the reference frequency to the frequency $f_M$ or the power reception-side coil $R_L$ is short-circuited. The control circuit 250 measures the time which has elapsed since the start of the performance of the $f_O$ change/short circuit operation (step S207), and stops the $f_O$ change/short circuit operation when the elapsed time reaches a predetermined time $t_{M1}$ (step S208). In other words, the resonant frequency $f_O$ is returned to the reference frequency or the short-circuiting of the power reception-side coil $R_L$ is cancelled.

Simultaneously with the stop of the $f_O$ change/short circuit operation or immediately after the stop, in step S209, the control circuit 250 connects the power reception circuit 230 to the resonant circuit RR through the control of the switching portion 210. Then, the control circuit 250 measures the time which has elapsed since the stop of the $f_O$ change/short circuit operation and the connection of the power reception circuit 230 to the resonant circuit RR (step S210), and when the elapsed time reaches a predetermined time $t_{M2}$, the process proceeds to step S211. In step S211, the control circuit 250 connects the communication circuit 220 to the resonant circuit RR through the control of the switching circuit 210, and then the process proceeds to step S212.

The time $t_{M1}$ is previously set such that during the period in which the pFOD processing is performed in the power feeding device 1, the performance of the $f_O$ change/short circuit operation is maintained, and that immediately after the period is completed, the $f_O$ change/short circuit operation is stopped. The time $t_{M2}$ is previously set such that during the period in which the power reception proper determination processing is performed in the power feeding device 1, the connection of the power reception circuit 230 to the resonant circuit RR is maintained, and that immediately after the period is completed, the connection to the resonant circuit RR is switched to the connection to the communication circuit 220. In the test requirement signal 530, the times $t_{M1}$ and $t_{M2}$ may be specified.

In step S212, the control circuit 250 uses the communication circuit 220 so as to be on standby for the reception of the authentication signal 550. When the authentication signal 550 is received in the communication circuit 220, in step S213, the control circuit 250 transmits the response signal 560 for the authentication signal 550 to the power feeding device 1 by the NFC communication using the communication circuit 220. When the foreign object is present on the power feeding stage 12, since the authentication signal 550 is not transmitted from the power feeding device 1, the process preferably returns to step S201 in a case where the authentication signal 550 is not received for a certain period of time in step S212.

After the transmission of the response signal 560, in step S214, the control circuit 250 connects the power reception circuit 230 to the resonant circuit RR through the control of the switching circuit 210, and then in step S215 subsequent thereto, starts the power reception operation using the power reception circuit 230. The control circuit 250 measures the time which has elapsed since the start of the power reception operation, and compares the elapsed time with a predetermined time $t_B$ (step S216). Then, when the elapsed time reaches the time $t_B$ (Y in step S216), in step S217, the control circuit 250 stops the power reception operation, and the process returns to step S201.

The time $t_B$ is previously determined or is specified in the authentication signal 550 such that the period during which the power reception operation is performed substantially coincides with the period during which the power transmission operation is performed in the power feeding device 1. A configuration may be adopted in which after the start of the power reception operation, the control circuit 250 monitors a charging current for the battery 21, and in which when the charging current value becomes equal to or less than a predetermined value, the control circuit 250 determines that the power transmission operation is completed so as to stop the power reception operation and transfer to step S201.

[mFOD Processing]

After the start of the power transmission operation, the foreign object may be placed on the power feeding stage 12. The mFOD processing functions as the foreign object detection processing in the power transfer, and whether or not the foreign object is present in the power transfer is continuously monitored by the mFOD processing.

Figure 21:
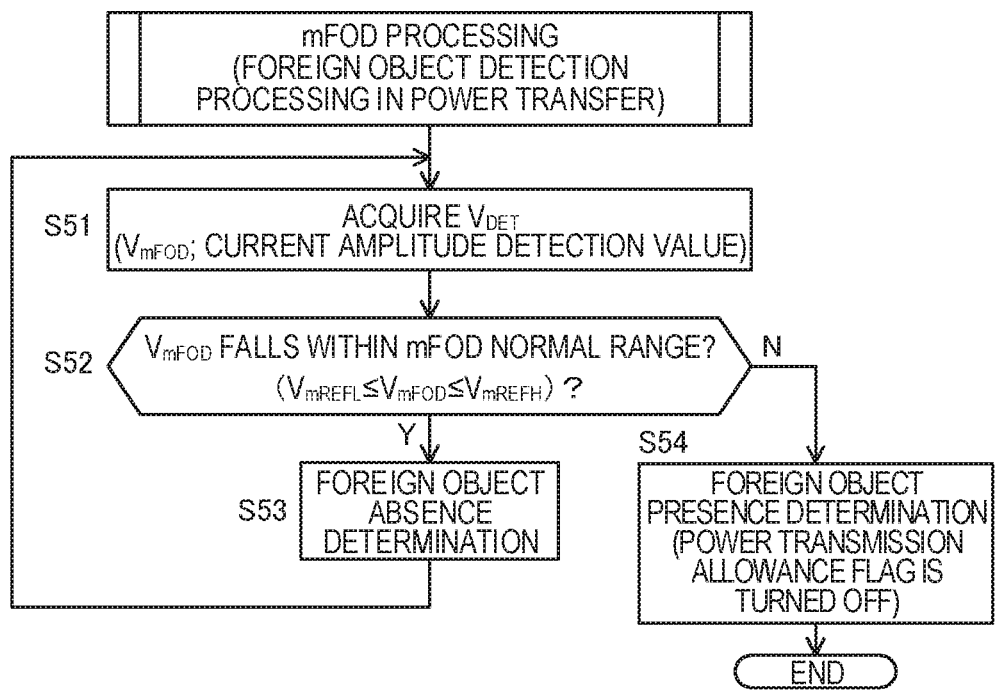
FIG. 21 is an operational flowchart of mFOD processing which is performed in the power feeding device.

FIG. 21 is an operational flowchart of the mFOD processing. During the period in which the power transmission operation is performed, the control circuit 160 repeatedly performs the mFOD processing in FIG. 21. In the mFOD processing, the control circuit 160 first acquires, in step S51, the latest voltage value $V_{DET}$ as a current amplitude detection value $V_{mFOD}$. The current amplitude detection value $V_{mFOD}$ has a value corresponding to the amplitude of the current flowing through the power transmission-side coil $T_L$ when the power transmission magnetic field is generated in the power transmission-side coil $T_L$. Then, in step S52 subsequent thereto, the control circuit 160 determines whether or not the current amplitude detection value $V_{mFOD}$ falls within a predetermined mFOD normal range. When the current amplitude detection value $V_{mFOD}$ falls within the mFOD normal range, the foreign object absence determination is made (step S53), the process returns to step S51 and the processing in steps S51 and S52 is repeated whereas when the current amplitude detection value $V_{mFOD}$ falls outside the mFOD normal range, in step S54, the foreign object presence determination is made such that the power transmission allowance flag is set off. The power transmission allowance flag is controlled by the control circuit 160 so as to be set on or off. When the power transmission allowance flag is on, the control circuit 160 allows the performance of the power transmission operation whereas when the power transmission allowance flag is off, the control circuit 160 prohibits the performance of the power transmission operation or stops the power transmission operation being performed.

The mFOD normal range is a range which is equal to or more than a predetermined lower limit value $V_{mREFL}$ but equal to or less than a predetermined upper limit value $V_{mREFH}$ ($0 < V_{mREFL} < V_{mREFH}$). Hence, when a determination inequality "$V_{mREFL} \leq V_{mFOD} \leq V_{mREFH}$" is satisfied, the foreign object absence determination is made whereas when the determination inequality is not satisfied, the foreign object presence determination is made.

Figure 22A:
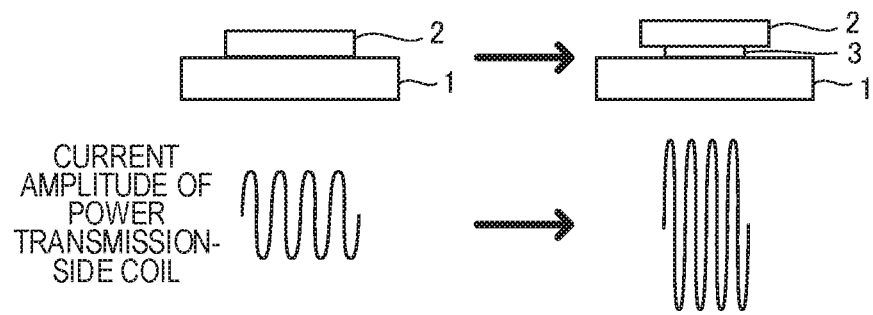
FIG. 22A and FIG. 22B are diagrams for illustrating a change in the current amplitude of a power transmission-side coil when the foreign object is inserted in the power transfer.

Consider, with reference to FIG. 22A, for example, a case where when the power transmission operation is performed, the foreign object 3 which is formed as a non-contact IC card is inserted between the power feeding stage 12 of the power feeding device 1 and the electronic device 2. In this case, the power reception-side coil $R_L$ of the electronic device 2 is magnetically coupled to the coil $J_L$ of the foreign object 3, and thus the resonant frequency of the resonant circuit RR in the electronic device 2 is displaced from the reference frequency (13.56 MHz) together with the resonant frequency of the resonant circuit JJ in the foreign object 3. Then, the power received in the power reception-side coil $R_L$ is lowered, and thus the load of the power transmission seen from the power transmission-side coil $T_L$ is reduced, with the result that the amplitude of the current flowing through the power transmission-side coil $T_L$ is increased (in this case, the upper limit value $V_{mREFH}$ is preferably determined such that "$V_{mREFH} < V_{mFOD}$").

Figure 22B:
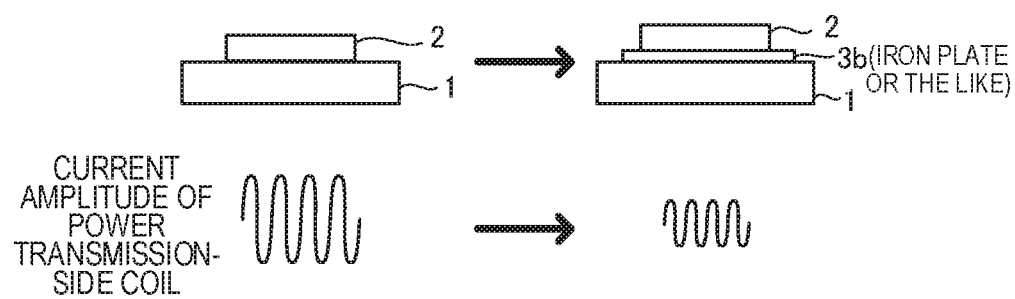

For example, with reference to FIG. 22B, when the power transmission operation is performed, if a foreign object 3b serving as an iron plate or a ferrite sheet is inserted between the power feeding stage 12 of the power feeding device 1 and the electronic device 2, a current flows within the foreign object 3b through electrical and magnetic action, with the result that the amplitude of the current flowing through the power transmission-side coil $T_L$ is decreased (in this case, the lower limit value $V_{mREFL}$ is preferably determined such that "$V_{mFOD} < V_{mREFL}$").

As described above, a change in the current amplitude detection value $V_{mFOD}$ is produced by whether or not the foreign object including the foreign objects 3 and 3b is present. Through experiments or the like with the assumption of the types of foreign objects and the states of arrangement which can be considered, the lower limit value $V_{mREFL}$ and the upper limit value $V_{mREFH}$ which are previously appropriately determined are preferably stored in the memory 150. To what degree the current amplitude detection value $V_{mFOD}$ is changed by the presence of the foreign object in the power transfer is estimated by theoretical calculation, and based on the result of the estimation, the lower limit value $V_{mREFL}$ and the upper limit value $V_{mREFH}$ may be determined and stored in the memory 150 without need for the experiments. Here, for example, with reference to the center value of the mFOD normal range, an object which changes the current amplitude detection value $V_{mFOD}$ by a predetermined rate of change or more may be defined as the foreign object.

The lower limit value $V_{mREFL}$ and the upper limit value $V_{mREFH}$ may be determined as follows. While the power transfer is being performed, the control circuit 160 periodically acquires the current amplitude detection values $V_{mFOD}$ one after another, and sequentially can determine the movement average values of the current amplitude detection values $V_{mFOD}$ periodically acquired. Here, it is assumed that the movement average value of 16 continuous values $V_{mFOD}$ can be determined.

After the start of the power transfer, the control circuit 160 sets the movement average value of 16 values $V_{mFOD}$ obtained in the recent past to a reference value $V_{mREF}$. Then, the control circuit 160 sets, based on the reference value $V_{mREF}$, the lower limit value $V_{mREFL}$ and the upper limit value $V_{mREFH}$. Specifically, ($V_{mREF} - \Delta V_{mREF}$) and ($V_{mREF} + V_{mREF}$) are set to the lower limit value $V_{mREFL}$ and the upper limit value $V_{mREFH}$, respectively. Alternatively, ($V_{mREF} - k_{mREF} \cdot V_{mREF}$) and ($V_{mREF} + k_{mREF} \cdot V_{mREF}$) are set to the lower limit value $V_{mREFL}$ and the upper limit value $V_{mREFH}$, respectively. $\Delta V_{mREF}$ is a predetermined positive value, and $k_{mREF}$ is a predetermined positive coefficient which is less than 1. After the setting of the first reference value $V_{mREF}$, each time $V_{mFOD}$ is newly acquired, the reference value $V_{mREF}$ is updated with the movement average value of 16 values $V_{mFOD}$ including the new $V_{mFOD}$. When the number of values $V_{mFOD}$ acquired after the start of the power transfer is less than 16, the average value of all the values $V_{mFOD}$ acquired after the start of the power transfer is preferably set to the reference value $V_{mREF}$. After the start of the power transfer, on the value $V_{mFOD}$ which is first acquired, the processing in steps S52 to S54 of FIG. 21 is not performed (because the reference value $V_{mREF}$ is not set).

By use of this method, one or more current amplitude detection values $V_{mFOD}$ acquired in the past are used so as to set $V_{mREFL}$ and $V_{mREFH}$. The mFOD processing is processing for determining whether or not the foreign object which can be inserted partway through the power transfer after the start of the power transfer is present, and the determination can be realized by monitoring a change from the reference value $V_{mREF}$ based on the values $V_{mFOD}$ in the past. By utilization of the movement average, it is possible to reduce an erroneous operation caused by an unexpected variation such as noise. After the movement average value of 16 values $V_{mFOD}$ obtained immediately after the start of the power transfer is set to the reference value $V_{mREF}$, in the power transfer, the reference value $V_{mREF}$ may be fixed (that is, a configuration may be adopted in which the reference value $V_{mREF}$ is not updated).

The amplification factor of the amplifier 143 shown in FIG. 7 is variable. The amplitude of the current flowing through the power transmission-side coil $T_L$ when the power transmission operation and the mFOD processing are performed is considerably larger than that when the pFOD processing is performed. Hence, when the mFOD processing is performed, the control circuit 160 sets the amplification factor of the amplifier 143 smaller than the amplification factor when the pFOD processing is performed, and thus the pFOD processing and the mFOD processing are set substantially the same as each other in the input signal range of the A/D converter 144. The same is true for the power reception proper determination processing. For example, preferably, when the magnitude of the determination alternating current voltage supplied to the power transmission-side coil $T_L$ in the power reception proper determination processing is set equal to that of the power transmission alternating current voltage, the control circuit 160 sets the amplification factor of the amplifier 143 when the power reception proper determination processing is performed smaller than the amplification factor when the pFOD processing is performed, and thus the pFOD processing and the power reception proper determination processing are set substantially the same as each other in the input signal range of the A/D converter 144.

For example, between the envelope detector 142 and the A/D converter 144 (more specifically, between the envelope detector 142 and the amplifier 143 or between the amplifier 143 and the A/D converter 144), a high-frequency reduction circuit (unillustrated) may be inserted. In this case, amplitude information which is obtained by performing high-frequency reduction processing (in other words, averaging processing or low-pass filtering) on a voltage drop signal for the sense resistor 141 can be obtained as the voltage value $V_{DET}$ from the A/D converter 144. In the high-frequency reduction processing here, the signal components of relatively low frequencies in the voltage drop signal for the sense resistor 141 are passed whereas the signal components of relatively high frequencies are reduced (attenuated). By the high-frequency reduction processing, the performance of control on the prohibition of the power transmission caused such as by noises or light vibrations in the electronic device 2 on the power feeding stage 12 is reduced.

For example, instead of the provision of the high-frequency reduction circuit between the envelope detector 142 and the A/D converter 144, high-frequency reduction processing by computation may be performed on the voltage value $V_{DET}$ of the output signal of the A/D converter 144, and the voltage value $V_{DET}$ after the high-frequency reduction processing may be used as the current amplitude detection value $V_{mFOD}$ (the same may be true for $V_{pFOD}$ in the pFOD processing and $V_R$ in the power reception proper determination processing). The high-frequency reduction processing by computation is processing which is performed in the control circuit 160, and in which the signal components of relatively low frequencies in the output signal of the A/D converter 144 are passed whereas the signal components of relatively high frequencies are reduced (attenuated).

The role of the mFOD processing is not limited to the determination as to whether or not the foreign object is present. In other words, the mFOD processing plays a role in turning off the power transmission allowance flag under any conditions that are unsuitable for the continuation of the power transmission operation, such as a condition in which the current amplitude detection value $V_{mFOD}$ falls outside the mFOD normal range. For example, when after the start of the power transmission operation, the electronic device 2 is removed from the top of the power feeding stage 12, the load of the power transmission seen from the power transmission-side coil $T_L$ is reduced such that the current amplitude detection value $V_{mFOD}$ exceeds the upper limit value $V_{mREFH}$ and thus the power transmission allowance flag is turned off (step S54 in FIG. 21).

By the mFOD processing, under conditions that are unsuitable for the continuation of the power transmission operation, such as when the foreign object is placed on the power feeding stage 12 after the start of the power transmission operation, the power transmission operation is stopped through the mFOD processing, and thus it is possible to prevent the destruction or the like of the foreign object caused by the continuation of the power transmission operation.

[Initial Setting Processing]

Initial setting processing which can be performed in the non-contact power feeding system before the operation of FIG. 19 and FIG. 20 will then be described. The initial setting processing may be performed with arbitrary timing before the performance of the power transfer by the non-contact power feeding system. It is assumed that for example, when the non-contact power feeding system is manufactured or shipped or before the user newly uses the power feeding device 1 and/or the electronic device 2, the initial setting processing is performed.

FIG. 23 is an operational flowchart of the initial setting processing. The initial setting processing is formed with processing in steps S71 to S78. The initial setting processing is performed under a first initial setting environment and a second initial setting environment.

In the first initial setting environment, a load for the power transmission-side coil $T_L$ is not present at all or is small enough to be ignored. Hence, the separate state of FIG. 1A satisfies the first initial setting environment. As with the reference arrangement state of FIG. 1B, an environment in which the electronic device 2 is placed on the power feeding stage 12 but in which the $f_O$ change/short circuit operation is performed in the electronic device 2 is also one form of the first initial setting environment. This is because when the $f_O$ change/short circuit operation is performed, the power reception-side coil $R_L$ does not substantially function as a load for the power transmission-side coil $T_L$. The first initial setting environment can be said to be equivalent to an environment in which the pFOD processing is performed.

In the second initial setting environment, the electronic device 2 is placed on the power feeding stage 12 in the reference arrangement state, the $f_O$ change/short circuit operation is not performed in the electronic device 2 and the resonant circuit RR is connected to the power reception circuit 230. In other words, the second initial setting environment is assumed to be the same as an environment in which the power transfer is performed.

For example, a configuration is preferably adopted in which when in a state where the electronic device 2 is placed on the power feeding stage 12 in the reference arrangement state, the user inputs a predetermined initial setting operation to the power feeding device 1 or the electronic device 2, the initial setting processing formed with steps S71 to S78 is performed.

In the initial setting processing, in step S71, under the first initial setting environment, the control circuit 160 first controls the power transmission circuit 130 so as to supply the pFOD alternating current voltage to the resonant circuit TT. In this way, the pFOD magnetic field is generated in the power transmission-side coil $T_L$. The pFOD alternating current voltage and the pFOD magnetic field described here are the same as those which are supplied and generated in the pFOD processing (see FIG. 12). In step S72 subsequent to step S71, the control circuit 160 uses the load detection circuit 140 so as to acquire, as a current amplitude detection value $V_{1A}$, the voltage value $V_{DET}$ when the pFOD magnetic field is generated under the first initial setting environment. In step S73 subsequent thereto, the control circuit 160 sets, based on the detection value $V_{1A}$, the lower limit value $V_{pREFL}$ in the pFOD normal range, and stores the set lower limit value $V_{pREFL}$ in the memory 150. The lower limit value $V_{pREFL}$ is set lower than $V_{1A}$ such that only under the presence of the foreign object 3, the foreign object presence determination is made in the pFOD processing. For example, it is preferable that "$V_{pREFL}=V_{1A}-\Delta_1$" or "$V_{pREFL}=V_{1A}\times k_1$". $\Delta_1$ is a predetermined positive minute value (however, it is possible to make a setting such that $\Delta_1=0$). $k_1$ is a predetermined positive value which is less than 1.

After step S73, in step S74, under the first initial setting environment, the control circuit 160 controls the power transmission circuit 130 so as to supply the determination alternating current voltage to the resonant circuit TT. In this way, the determination magnetic field is generated in the power transmission-side coil $T_L$. The determination alternating current voltage and the determination magnetic field described here are the same as those which are supplied and generated in the power reception proper determination processing (see FIG. 16). In step S75 subsequent to step S74, the control circuit 160 uses the load detection circuit 140 so as to acquire, as a current amplitude detection value $V_{1B}$, the voltage value $V_{DET}$ when the determination magnetic field is generated under the first initial setting environment. When the magnitude of the determination alternating current voltage is equal to that of the pFOD alternating current voltage, the processing in steps S74 and S75 is not necessary, and it is preferable to assume that "$V_{1B}=V_{1A}$".

After step S75, in step S76, under the second initial setting environment, the control circuit 160 controls the power transmission circuit 130 so as to supply the determination alternating current voltage to the resonant circuit TT. In this way, the determination magnetic field is generated in the power transmission-side coil $T_L$. In step S77 subsequent to step S76, the control circuit 160 uses the load detection circuit 140 so as to acquire, as a current amplitude detection value $V_{2B}$, the voltage value $V_{DET}$ when the determination magnetic field is generated under the second initial setting environment. In step S78 subsequent thereto, the control circuit 160 sets, based on at least one of the detection values $V_{1B}$ and $V_{2B}$, the determination reference value $V_{RREF}$ (see FIG. 16) used in the power reception proper determination processing, and stores the set determination reference value $V_{RREF}$ in the memory 150. When the determination reference value $V_{RREF}$ is set without use of the detection value $V_{1B}$, the processing in steps S74 and S75 is not necessary, and when the determination reference value $V_{RREF}$ is set without use of the detection value $V_{2B}$, the processing in steps S76 and S77 is not necessary.

Figure 24:
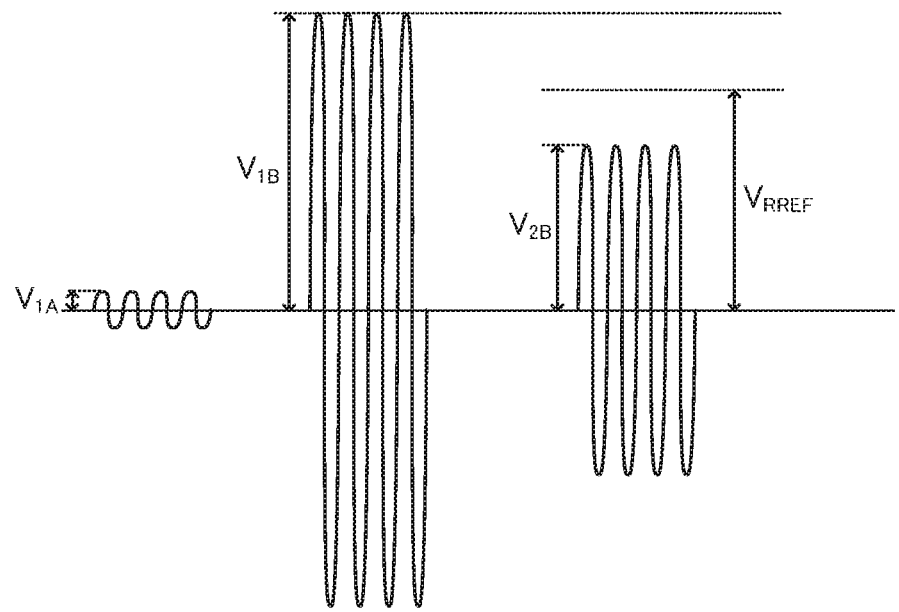
FIG. 24 is a diagram showing a relationship between a plurality of voltage waveforms and a determination reference value on the initial setting processing.

FIG. 24 shows an image view of a magnitude relationship between $V_{1A}$, $V_{1B}$, $V_{2B}$ and $V_{RREF}$. However, in FIG. 24, it is assumed that the magnitude of the determination alternating current voltage is larger than that of the pFOD alternating current voltage and that the amplification factor of the amplifier 143 in FIG. 7 is fixed. Hence, in principle, "$V_{1B}>V_{2B}$" holds true.

For example, the determination reference value $V_{RREF}$ is preferably set according to formula (1A) or (1B) below. $\Delta_2$ is a predetermined positive value. $k_1$ is a predetermined positive value which is more than 1. When formula (1A) or (1B) is used, with reference to the current amplitude detection value $V_{2B}$ when the determination alternating current voltage is supplied to the resonant circuit TT under the second initial setting environment, a value which is only a predetermined amount larger than $V_{2B}$ is set as the determination reference value $V_{RREF}$. However, when formula (1A) or (1B) is used, a restriction is added such that $V_{RREF}$ is prevented from being equal to or more than $V_{1B}$.

$$V_{RREF}=V_{2B}+\alpha_2 \tag{1A}$$

$$V_{RREF}=V_{2B}\times k_2 \tag{1B}$$

As another example, the determination reference value $V_{RREF}$ is preferably set according to formula (2A) or (2B) below. $\Delta_3$ is a predetermined positive value. $k_3$ is a predetermined positive value which is less than 1. When formula (2A) or (2B) is used, with reference to the current amplitude detection value $V_{1B}$ when the determination alternating current voltage is supplied to the resonant circuit TT under the first initial setting environment, a value which is only a predetermined amount smaller than $V_{1B}$ is set as the determination reference value $V_{RREF}$. However, when formula (2A) or (2B) is used, a restriction is added such that $V_{RREF}$ is prevented from being equal to or less than $V_{2B}$.

$$V_{RREF}=V_{1B}-\Delta_3 \tag{2A}$$

$$V_{RREF}=V_{1B}\times k_3 \tag{2B}$$

As yet another example, the determination reference value $V_{RREF}$ is preferably set according to formula (3) below. $k_4$ is a predetermined positive value which is less than 1. When formula (3) is used, as in the case where formula (1A) or (1B) is used, with reference to the current amplitude detection value $V_{2B}$, a value which is only a predetermined amount larger than $V_{2B}$ is set as the determination reference value $V_{RREF}$, and the predetermined amount is based on a difference ($V_{1B}-V_{2B}$).

$$V_{RREF}=V_{2B}+k_4(V_{1B}-V_{2B}) \tag{3}$$

The voltage value $V_{DET}$ which will be obtained when the pFOD alternating current voltage is supplied to the power transmission-side coil $T_L$ under the first initial setting environment can be estimated by theoretical calculation in a design stage. Based on the estimated value (that is, the estimated value of $V_{1A}$ by theoretical calculation), without the processing in steps S71 and S72 being performed, the lower limit value $V_{pREFL}$ may be determined and stored in the memory 150. Likewise, the voltage values $V_{DET}$ which will be obtained when the determination alternating current voltage is supplied to the power transmission-side coil $T_L$ under the first and second initial setting environments can be estimated by theoretical calculation in the design stage. Based on the estimated values (that is, the estimated values of $V_{1B}$ and $V_{2B}$ by theoretical calculation), without the processing in steps S74 to S77 being performed, the determination reference value $V_{RREF}$ may be determined and stored in the memory 150.

<<Consideration on the Present Invention>>

The present invention embodied in the embodiment described above will be considered.

A power transmission device $W_1$ according to one aspect of the present invention which can transmit power to a power reception device by a magnetic field resonance method, includes: a power transmission-side resonant circuit (TT) which includes a power transmission-side coil ($T_L$) for performing the power transmission; a power transmission circuit (130) which can supply an alternating current voltage to the power transmission-side resonant circuit; a detection circuit (140) which detects the amplitude of a current flowing through the power transmission-side coil; and a control circuit (160) which performs power transmission control on the power by controlling a state of the supply of the alternating current voltage to the power transmission-side resonant circuit, where before the power transmission, the control circuit acquires, as a determination amplitude detection value ($V_R$), a detection value by the detection circuit when a predetermined determination alternating current voltage is supplied to the power transmission-side resonant circuit, and controls, based on the determination amplitude detection value, the performance of the power transmission through a determination as to whether or not the power reception device can perform the proper power reception.

A non-contact power feeding system $W_2$ according to one aspect of the present invention includes: a power transmission device that includes a power transmission-side resonant circuit (TT) including a power transmission-side coil ($T_L$) for transmitting power; and a power reception device that includes a power reception-side resonant circuit (RR) including a power reception-side coil ($R_L$) for receiving the power and can transmit and receive the power by a magnetic field resonance method, where the power transmission device includes: a power transmission circuit (130) which can supply an alternating current voltage to the power transmission-side resonant circuit; a detection circuit (140) which detects the amplitude of a current flowing through the power transmission-side coil; and a control circuit (160) which performs power transmission control on the power by controlling a state of the supply of the alternating current voltage to the power transmission-side resonant circuit, and before the power transmission, the control circuit acquires, as a determination amplitude detection value ($V_R$), a detection value by the detection circuit when a predetermined determination alternating current voltage is supplied to the power transmission-side resonant circuit, and controls, based on the determination amplitude detection value, the performance of the power transmission through a determination as to whether or not the power reception device can perform the proper power reception.

The determination amplitude detection value is used, and thus it is possible to determine whether or not the power reception device is present in such a position that it is possible to perform the proper power reception. By use of the result thereof, the control on the performance of the power transmission is performed, and thus, for example, when it is determined that it is impossible to perform the proper power reception, it is possible to restrict the performance of the power transmission, with the result that it is possible to reduce the generation of excessive unnecessary radiation and useless power consumption.

Specifically, for example, preferably, in the power transmission device $W_1$ or the non-contact power feeding system $W_2$, when the determination amplitude detection value is equal to or less than a predetermined reference value ($V_{RREF}$), the control circuit determines that the power reception device can perform the proper power reception so as to allow the performance of the power transmission whereas when the determination amplitude detection value is not equal to or less than the predetermined reference value, the control circuit restricts the performance of the power transmission.

When the distance between the power transmission device and the power reception device is relatively large, the degree of magnetic coupling between the power transmission-side coil and the power reception-side coil is relatively decreased, with the result that it is difficult to perform the proper power reception. On the other hand, when the distance between the power transmission device and the power reception device is relatively large, the magnitude of a load for the power transmission-side coil is relatively decreased, and the determination amplitude detection value is relatively increased. Hence, when the determination amplitude detection value is relatively large (that is, when the determination amplitude detection value is larger than the predetermined reference value), a restriction is added to the performance of the power transmission, with the result that it is possible to reduce the generation of excessive unnecessary radiation and useless power consumption.

Specifically, for example, preferably, in the power transmission device $W_1$ or the non-contact power feeding system $W_2$, after the control circuit receives, from the power reception device, a response signal for a predetermined signal transmitted wirelessly from the power transmission device, the control circuit performs processing including the acquisition of the determination amplitude detection value.

The conditions in which the response signal for the predetermined signal transmitted wirelessly from the power transmission device is received from the power reception device correspond to the conditions in which the power reception device is located in the communication possible region when seen from the power transmission device. It is not always clear, only from the fact that the power reception device is located in the communication possible region, that the proper power reception can be performed, and thus it is not appropriate to allow the performance of the power transmission due to only the fact. Hence, after it is confirmed that the power reception device is located in the communication possible region, by the processing including the acquisition of the determination amplitude detection value, whether or not the proper power reception can be performed is determined.

For example, preferably, in the non-contact power feeding system $W_2$, the power reception device includes a change/short circuit (240) which can change the resonant frequency of the power reception-side resonant circuit from a reference frequency that is a resonant frequency at the time of the power reception or can short-circuit the power reception-side coil, before the power transmission, the control circuit can perform: first processing (pFOD processing) for determining whether or not a foreign object is present that differs from the power reception device and that can generate a current based on a magnetic field generated in the power transmission-side coil; and second processing (power reception proper determination processing) for determining whether or not the power reception device can perform the proper power reception, in the first processing, in a state where the power reception device changes the resonant frequency of the power reception-side resonant circuit or short-circuits the power reception-side coil according to a signal by communication from the power transmission device, a predetermined foreign object determination alternating current voltage is supplied to the power transmission-side resonant circuit, a detection value by the detection circuit at that time is acquired as a foreign object detection amplitude detection value ($V_{pFOD}$) and whether or not the foreign object is present is determined based on the foreign object detection amplitude detection value and when it is determined that the foreign object is present, the performance of the power transmission is restricted.

In this way, it is possible to prevent the destruction or the like of the foreign object which can be present caused by the performance of the power transmission.

Here, for example, preferably, in the non-contact power feeding system $W_2$, when the control circuit determines that the foreign object is not present and determines that the power reception device can perform the proper power reception, the control circuit allows the performance of the power transmission.

For example, preferably, in the non-contact power feeding system $W_2$, the control circuit determines, in the first processing, whether or not the foreign object detection amplitude detection value falls outside a predetermined range (pFOD normal range) so as to determine whether or not the foreign object is present.

For example, preferably, in the non-contact power feeding system $W_2$, when the determination amplitude detection value is acquired, the changing or the short-circuiting by the change/short circuit is not performed.

In the power transmission device according to the present invention, a plurality of power transmission-side coils (hence, a plurality of power transmission-side resonant circuits which individually include the power transmission-side coils) may be provided. Likewise, in the power reception device according to the present invention, a plurality of power reception-side coils (hence, a plurality of power reception-side resonant circuits which individually include the power reception-side coils) may be provided.

The power feeding device 1 itself in the embodiment described above may function as the power transmission device according to the present invention or part of the power feeding device 1 in the embodiment described above may function as the power transmission device according to the present invention. Likewise, the electronic device 2 itself in the embodiment described above may function as the power reception device according to the present invention or part of the electronic device 2 in the embodiment described above may function as the power reception device according to the present invention.

<<Variations and the Like>>

The embodiment of the present invention can be variously changed as necessary within the technical idea indicated in the scope of claims. The embodiment described above is simply an example of the embodiment of the present invention, and the significance of the terms in the present invention and the configuration requirements is not limited to the description of the above embodiment. The specific values indicated in the above description are simply illustrative, and can naturally be changed to various values. As explanatory notes which can be applied to the embodiment described above, explanatory notes 1 to 3 will be described below. The details described in the explanatory notes can be arbitrarily combined unless otherwise a contradiction arises.

[Explanatory Note 1]

Although in the embodiment described above, the frequencies of various types of signals and the resonant frequencies are set to 13.56 MHz serving as the reference frequency, 13.56 MHz is a target value for the setting, and in the actual device, the frequencies include errors.

[Explanatory Note 2]

Although the present invention embodied in conformance with the standard of the NFC is described in the embodiment, and thus in the description, the reference frequency is 13.56 MHz, the reference frequency may be any frequency other than 13.56 MHz. In relation to what has been described above, the communication and the power transfer between the power feeding device and the electronic device to which the present invention is applied may be communication and power transfer in conformance with a standard other than the NFC.

Even in a case where the reference frequency of the non-contact power feeding system according to the present invention is set to a frequency other than 13.56 MHz (for example, 6.78 MHz), and where the resonant frequency of the resonant circuit JJ in the foreign object 3 formed as a non-contact IC card is 13.56 MHz, when the foreign object 3 is placed on the power feeding stage 12, a corresponding change in the voltage value $V_{DET}$ is produced in the pFOD processing or the mFOD processing. Hence, even in such a case, it is possible to detect the foreign object 3 by the method described above.

[Explanatory Note 3]

A target device which is the power reception device or the power transmission device according to the present invention can be formed by hardware such as an integrated circuit or a combination of hardware and software. An arbitrary specific function which is the entire function realized in the target device or part thereof may be described as a program, and the program may be stored in a flash memory capable of installing the program in the target device. Then, the program may be executed on a program executing device (for example, a microcomputer which can be installed in the target device) so as to realize the specific function. The program can be stored and fixed in an arbitrary recording medium. The recording medium in which the program is stored and fixed may be installed in or connected to a device (such as a server device) which is different from the target device.

LIST OF REFERENCE SYMBOLS 1 power feeding device
2 electronic device
130 NFC power transmission circuit
140 load detection circuit
160 control circuit
240 resonant state change circuit
TT power transmission-side resonant circuit
$T_L$ power transmission-side coil
$T_C$ power transmission-side capacitor
RR power reception-side resonant circuit
$R_L$ power reception-side coil
$R_C$ power reception-side capacitor

The invention claimed is:

1. A power transmission device which can transmit power to a power reception device by a magnetic field resonance method, the power transmission device comprising:
   a power transmission-side resonant circuit which includes a power transmission-side coil for performing the power transmission;
   a power transmission circuit which can supply an alternating current voltage to the power transmission-side resonant circuit;
   a detection circuit which detects an amplitude of a current flowing through the power transmission-side coil; and a control circuit which performs power transmission control on the power by controlling a state of the supply of the alternating current voltage to the power transmission-side resonant circuit, wherein before the power transmission, the control circuit acquires, as a determination amplitude detection value, a detection value by the detection circuit when a predetermined determination alternating current voltage is supplied to the power transmission-side resonant circuit, and controls, based on the determination amplitude detection value, performance of the power transmission through a determination as to whether or not the power reception device can perform proper power reception.

2. The power transmission device according to claim 1, wherein when the determination amplitude detection value is equal to or less than a predetermined reference value, the control circuit determines that the power reception device can perform the proper power reception so as to allow the performance of the power transmission whereas when the determination amplitude detection value is not equal to or less than the predetermined reference value, the control circuit restricts the performance of the power transmission.

3. The power transmission device according to claim 1, wherein after the control circuit receives, from the power reception device, a response signal for a predetermined signal transmitted wirelessly from the power transmission device, the control circuit performs processing including the acquisition of the determination amplitude detection value.

4. A non-contact power feeding system which comprises: a power transmission device that includes a power transmission-side resonant circuit including a power transmission-side coil for transmitting power; and a power reception device that includes a power reception-side resonant circuit including a power reception-side coil for receiving the power and which can transmit and receive the power by a magnetic field resonance method, wherein the power transmission device includes:
a power transmission circuit which can supply an alternating current voltage to the power transmission-side resonant circuit;
a detection circuit which detects an amplitude of a current flowing through the power transmission-side coil; and
a control circuit which performs power transmission control on the power by controlling a state of the supply of the alternating current voltage to the power transmission-side resonant circuit, and
before the power transmission, the control circuit acquires, as a determination amplitude detection value, a detection value by the detection circuit when a predetermined determination alternating current voltage is supplied to the power transmission-side resonant circuit, and controls, based on the determination amplitude detection value, performance of the power transmission through a determination as to whether or not the power reception device can perform proper power reception.

5. The non-contact power feeding system according to claim 4,
wherein when the determination amplitude detection value is equal to or less than a predetermined reference value, the control circuit determines that the power reception device can perform the proper power reception so as to allow the performance of the power transmission whereas when the determination amplitude detection value is not equal to or less than the predetermined reference value, the control circuit restricts the performance of the power transmission.

6. The non-contact power feeding system according to claim 4, wherein after the control circuit receives, from the power reception device, a response signal for a predetermined signal transmitted wirelessly from the power transmission device, the control circuit performs processing including the acquisition of the determination amplitude detection value.

7. The non-contact power feeding system according to claim 4,
wherein the power reception device includes a change/short circuit which can change a resonant frequency of the power reception-side resonant circuit from a reference frequency that is a resonant frequency at a time of the power reception or can short-circuit the power reception-side coil,
before the power transmission, the control circuit can perform: first processing for determining whether or not a foreign object is present that differs from the power reception device and that can generate a current based on a magnetic field generated in the power transmission-side coil; and second processing for determining whether or not the power reception device can perform the proper power reception,
in the first processing, in a state where the power reception device changes the resonant frequency of the power reception-side resonant circuit or short-circuits the power reception-side coil according to a signal by communication from the power transmission device, a predetermined foreign object determination alternating current voltage is supplied to the power transmission-side resonant circuit, a detection value by the detection circuit at that time is acquired as a foreign object detection amplitude detection value and whether or not the foreign object is present is determined based on the foreign object detection amplitude detection value and
when it is determined that the foreign object is present, the performance of the power transmission is restricted.

8. The non-contact power feeding system according to claim 7,
wherein when the control circuit determines that the foreign object is not present and determines that the power reception device can perform the proper power reception, the control circuit allows the performance of the power transmission.

9. The non-contact power feeding system according to claim 7,
wherein the control circuit determines, in the first processing, whether or not the foreign object detection amplitude detection value falls outside a predetermined range so as to determine whether or not the foreign object is present.

10. The non-contact power feeding system according to claim 7, wherein when the determination amplitude detection value is acquired, the changing or the short-circuiting by the change/short circuit is not performed.

* * * * *